(12) United States Patent  (10) Patent No.: US 8,382,377 B2
Yamamoto et al.  (45) Date of Patent: Feb. 26, 2013

(54) WHEEL BEARING APPARATUS INCORPORATED WITH A WHEEL SPEED DETECTING APPARATUS

(75) Inventors: Kazunari Yamamoto, Iwata (JP); Kohei Yoshino, Iwata (JP); Nobukatsu Uchiyama, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/096,101

(22) Filed: Apr. 28, 2011

(65) Prior Publication Data

US 2011/0254356 A1 Oct. 20, 2011

Related U.S. Application Data

(63) Continuation of application No. PCT/JP2009/005699, filed on Oct. 28, 2009.

(30) Foreign Application Priority Data

Oct. 29, 2008 (JP) .................................. 2008-277895
Nov. 25, 2008 (JP) .................................. 2008-299139

(51) Int. Cl.
*F16C 13/00* (2006.01)
*F16C 32/00* (2006.01)
*F16C 33/76* (2006.01)
*F16C 41/04* (2006.01)

(52) U.S. Cl. ........................................ 384/448; 384/544

(58) Field of Classification Search .................. 384/448, 384/489, 544, 589; 301/105.1
See application file for complete search history.

(56) References Cited

U.S. PATENT DOCUMENTS

| | | | | |
|---|---|---|---|---|
| 6,217,220 B1 * | 4/2001 | Ohkuma et al. | ............... | 384/489 |
| 7,980,766 B2 * | 7/2011 | Tsuzaki | ........................ | 384/544 |
| 2002/0126926 A1 | 9/2002 | Ohtsuki et al. | | |
| 2004/0126044 A1 | 7/2004 | Ohtsuki et al. | | |
| 2004/0228556 A1 * | 11/2004 | Ohtsuki et al. | ................ | 384/448 |
| 2005/0259902 A1 | 11/2005 | Ohtsuki et al. | | |
| 2007/0268013 A1 * | 11/2007 | Yamamoto et al. | ........... | 324/174 |

FOREIGN PATENT DOCUMENTS

| | | |
|---|---|---|
| EP | 1 469 239 | 11/2007 |
| EP | 1 795 788 | 3/2010 |
| JP | 2000-198304 | 7/2000 |
| JP | 2000-249138 | 9/2000 |
| JP | 2002-267680 | 9/2002 |
| JP | 2004-076752 | 3/2004 |
| JP | 2005-009632 | 1/2005 |
| JP | 2005-133953 | 5/2005 |
| JP | 2005-280567 | 10/2005 |
| JP | 2008-100620 | 5/2008 |
| JP | 2008-105626 | 5/2008 |
| JP | 2008-164083 | 7/2008 |
| WO | WO2008/081875 | 7/2008 |

* cited by examiner

*Primary Examiner* — Phillip A Johnson
(74) *Attorney, Agent, or Firm* — Harness, Dickey & Pierce, P.L.C.

(57) ABSTRACT

A wheel speed detecting apparatus incorporating a wheel speed detecting apparatus has an inner ring axially secured on a wheel hub. A protecting cover, with a substantially dish-shaped configuration, is press-formed from a non-magnetic austenitic stainless steel sheet. The cover includes a cylindrical fitting portion adapted to be fit onto the outer member. A disc-shaped shielding portion extends radially inward from the fitting portion. A bottom portion extends from the shielding portion, via an inclined portion, to close the inner side end of the inner member. The protecting cover is positioned to abut against a stepped portion formed on the end face or the inner circumference of the outer member.

17 Claims, 24 Drawing Sheets

US 8,382,377 B2

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2009/005699, filed Oct. 28, 2009, which claims priority to Japanese Application Nos. 2008-277895, filed Oct. 29, 2008 and 2008-299139, filed Nov. 25, 2008. The disclosures of the above applications are incorporated herein by reference.

FIELD

The present disclosure relates to a wheel bearing apparatus, incorporating a wheel speed detecting apparatus, to rotationally support a wheel of a vehicle and detecting the wheel speed.

BACKGROUND

A wheel bearing apparatus, incorporating a wheel speed detecting apparatus, to rotationally support a wheel of a vehicle and to detect the wheel speed is generally known. The wheel bearing apparatus supports a wheel of vehicle relative to a suspension apparatus. It incorporates a wheel speed detecting apparatus to detect a rotation speed of the wheel of the vehicle to control an anti-lock braking system (ABS). Such a bearing apparatus generally includes a sealing apparatus arranged between inner and outer members that rotate relative to each other via rolling elements. A magnetic encoder, with magnetic poles alternately arranged along its circumference, is integrated into the sealing apparatus. Alternatively, wheel speed detecting sensors, to detect the variation in magnetic poles of the magnetic encoder according to the rotation of wheel, can be mounted on a knuckle that forms part of a suspension apparatus of a vehicle after the wheel bearing apparatus has been mounted onto the knuckle.

A known example of a wheel bearing apparatus incorporating a wheel speed detecting apparatus is shown in FIG. 32. The wheel bearing apparatus includes an outer member 50, an inner member 51, and a plurality of balls 52 contained therebetween. The inner member 51 includes a wheel hub 53 and an inner ring 54 press-fit onto the wheel hub 53.

The outer member 50 has an integrally formed body mounting flange 50b on its outer circumference. Double row outer raceway surfaces 50a and 50a are integrally formed on the outer member inner circumference. In addition, a sensor 63 is secured on the knuckle 65 by a screw 66.

The wheel hub 53 includes a wheel mounting flange 55, on its one end, on which a wheel (not shown) is mounted. The wheel hub outer circumference includes an inner raceway surface 53a. A cylindrical portion 53b axially extends from the inner raceway surface 53a. The inner ring 54 includes an inner raceway surface 54a on its outer circumference. The inner ring 54 is axially secured on the cylindrical portion 53b by a caulked portion 53c that is formed by plastically deforming the end of the cylindrical portion 53b.

A seal ring 56 is inserted into the outer side end of the outer member 50. The lip of the sealing ring 56 slidably contacts the base 55a of the wheel mounting flange 55. An encoder 57 is fit onto the inner side outer circumference of the inner ring 54. The encoder 57 includes an annular supporting ring 58 having a substantially "L" shaped cross-section. An annular encoder body 59 is adhered to a whole side surface of the supporting ring 58. The encoder body 59 provides a rotary encoder to detect the wheel speed. The enclosed body 59 includes N and S poles alternately arranged along its circumference.

The inner side opening of the outer member 50 is closed by a cover 60. This cover 60 is formed of non-magnetic stainless steel plate, aluminum alloy plate or high functional resin etc. and has a simple "flat-U" configuration. It has a disc shaped closing plate portion 61 and a cylindrical fitting portion 62 positioned around the closing plate portion 61.

The side surface of the encoder body 59, forming the encoder 57, is closely opposed to the cover 60. A detecting portion 64, of the sensor 63, is arranged closely to or in contact with the side surface of the cover 60. The detecting portion 64 and the encoder body 59 oppose each other via the cover 60. The presence of the cover 60 prevents entry of water, iron dust, magnetized debris etc into the space between the sensor 63 and the encoder 57. Thus, it prevents breakage of the sensor 63 and the encoder 57 as well as preventing a disturbance or degradation of regular and cyclic variation of the magnetic characteristics of the encoder body 59. Reference Patent Document 1: Japanese Laid-open Patent Publication No. 249138/2000

However, a problem of the prior art wheel bearing apparatus incorporating a wheel speed detecting apparatus is that since the fastening and positioning of the cover 60 relative to the outer member 50 is not reliable and stable, it is believed that the cover 60 will be moved from its predetermined position during mounting of the cover 60, transportation of the bearing itself, assembly onto a vehicle, or after mounting of the wheel due to impact of gravel or the like that would strike it.

In addition, since the cover 60 has a simple "flat-U" configuration, it is believed that the cover 60 would contact the encoder body 59 due to deformation of the cover 60 caused by impact from gravel or the like that would strike it. Furthermore, since the detecting portion of the sensor is arranged opposite to the encoder 57 via the cover 60, it is believed that the air gap between the two would be increased. Thus, the detecting accuracy would be detracted.

SUMMARY

It is, therefore, an object of the present disclosure to provide a wheel bearing apparatus incorporating a wheel speed detecting apparatus that can protect the magnetic encoder shielding it from the outside of the bearing. This is accomplished by providing a protecting cover with a large rigidity to prevent its deformation. Thus, this can improve the reliability of detection of wheel speed by increasing the positioning accuracy of the protecting cover.

In order to achieve the objects, a wheel bearing apparatus incorporating a wheel speed detecting apparatus comprises an outer member integrally formed with double row outer raceway surfaces on its inner circumference. An inner member includes a wheel hub and at least one inner ring. The wheel hub is integrally formed with a wheel mounting flange on its one end. A cylindrical portion axially extends from the wheel mounting flange. The inner ring is press fit onto the cylindrical portion of the wheel hub. The wheel hub and the inner ring are formed on their outer circumferences with double row inner raceway surfaces that oppose the double row outer raceway surfaces. Double row rolling elements are contained between the inner and outer raceway surfaces of the inner and outer members. A magnetic encoder is mounted on the inner ring. Annular openings are formed by the inner and outer members. The openings are sealed by a seal mounted on an outer side end of the outer member and by a protecting cover. The inner ring is axially secured on the wheel hub under a predetermined bearing pre-pressure by a caulked portion. The caulked portion is formed by plastically deforming the end of the cylindrical portion of the wheel hub. The protecting cover is formed with a substantially dish-shaped configuration by press-forming a non-magnetic austenitic stainless steel sheet. The cover includes a cylindrical fitting portion adapted to be fit onto the outer member. A disc-shaped shielding portion extends radially inward from the fitting portion. A bottom portion extends from the shielding portion via an inclined portion to close the inner side end of the inner member. The protecting cover is positioned to abut against a stepped portion formed on the end face or the inner circumference of the outer member.

A wheel bearing apparatus incorporating an inner ring rotational type wheel speed detecting apparatus, has the inner ring axially secured on the wheel hub under a predetermined bearing pre-pressure by a caulked portion that is formed by plastically deforming the end of the cylindrical portion of the wheel hub. The protecting cover is formed with a substantially dish-shaped configuration by press-forming a non-magnetic austenitic stainless steel sheet. The protective cover has a cylindrical fitting portion adapted to be fit into the inner circumference of the outer member. A disc-shaped shielding portion extends radially inward from the fitting portion. A bottom portion extends from the shielding portion via an inclined portion to close the inner side end of the inner member. The protecting cover is positioned to abut against a stepped portion formed on the end face or the inner circumference of the outer member. Thus, it is possible to increase the rigidity of the protecting cover due to its stepped and/or flanged cross-sectional configuration. Thus, this suppresses the deformation of the protecting cover if gravel or the like would strike the protecting cover. Accordingly, it is possible to improve the positioning accuracy of the protecting cover relative to the outer member. Additionally, it is possible to perform the exact adjustment of air gap between the magnetic encoder and the sensor. Thus, this increases the reliability of the detection of wheel speed.

The protecting cover further comprises a flange portion formed as a folded and stacked portion. The flange portion extends radially outward from the fitting portion and is adapted to be in close contact with the inner side end face of the outer member. The folded and stacked portion can increase the rigidity of the protecting cover. Thus, this suppresses deformation if gravel or the like would strike the protecting cover. In addition, since the protecting cover can be press-fit until the flange portion is in close contact with the inner side end face of the outer member, it is possible to improve the positioning accuracy of the protecting cover relative to the outer member. This enables the exact adjustment of the air gap between the magnetic encoder and the sensor. Thus, this increases the reliability of the detection of the wheel speed.

A detecting surface of the magnetic encoder is arranged to project from the inner side end face of the outer member. It projects by an amount (length) "a". The projected length "a" is set smaller than a thickness "t" of the protecting cover (i.e. a<t). This makes it possible to prevent the contact of the protecting cover against the inner ring and to set the air gap small.

The protecting cover further includes a central recess formed at the center of the bottom portion of the protecting cover. Thus, it extends into a recess encircled by the caulked portion. This makes it possible to increase the rigidity of the protecting cover. Thus, this suppresses its deformation if gravel or the like would strike the protecting cover.

The central recess is formed with a substantially rectangular cross-section along the configuration of the recess encircled by the caulked portion. This enables a further increase in the rigidity of the protecting cover.

The protecting cover further includes a recess formed in its shielding portion to contain a sensor. Thus, the sensor is positionable nearer to the magnetic encoder. This makes it possible to increases the rigidity of the protecting cover. Thus, this suppresses its deformation if gravel or the like would strike the protecting cover. In addition, it is possible to set the air gap small and thus improve the detection accuracy.

An access enables amount "c" (i.e. an amount "c" of the recess enabling the sensor to be positioned nearer to the magnetic encoder) is set smaller than the thickness "b" of the flange portion of the protecting cover (i.e. c<b). This makes it possible to prevent the contact of the protecting cover against the inner ring. Also, this increases the rigidity of the protecting cover and suppresses its deformation if gravel or the like would strike the protecting cover as well as enabling setting of the air gap small.

The recess is formed with an arcuate configuration. This enables some error in the accuracy of circumferential positioning of the protecting cover relative to the sensor.

The protecting cover further includes a through aperture formed in its shielding portion. An elastic member, to close off the through aperture, is integrally adhered by vulcanizing adhesion to the shielding portion. The magnetic encoder and the sensor are arranged opposite to each other via the elastic member. This enables some error in the accuracy of axial positioning of the protecting cover relative to the sensor and thus insures desirable detecting accuracy. In addition, this enables use of cold rolled steel sheet, superior in deep drawability, without the use of expensive stainless steel and thus provides a reduction in cost.

The through aperture is formed with an arcuate configuration. This enables some error in the accuracy of circumferential positioning of the protecting cover relative to the sensor.

An elastic member is integrally adhered to the protecting cover by vulcanizing adhesion. The elastic member is adapted to contact the inner side end face of the outer member. This makes it possible to improve the sealability of the fitting portion of the protecting cover relative to the outer member. Thus, this surely prevents leakage of lubricating grease sealed within the bearing and entry of rain water or dust into the bearing.

An elastic member is integrally adhered to a free end of the fitting portion of the protecting cover by vulcanizing adhesion. The elastic member is adapted to be press-fit into or in contact with the inner side end portion of the outer member. This also makes it possible to improve the sealability of the fitting portion of the protecting cover relative to the outer member. Thus, this surely prevents leakage of lubricating grease sealed within the bearing and entry of rain water or dust into the bearing.

An adhesive agent used for the vulcanized adhesion of the elastic members is applied to the whole surface or the surface to be fit onto the outer member of the protecting cover. This also makes it possible to improve the sealability of the fitting portion of the protecting cover relative to the outer member.

A wheel speed detecting apparatus of the present disclosure includes an outer member integrally formed, on its inner circumference, with double row outer raceway surfaces. An inner member includes a wheel hub and at least one inner ring. The wheel hub is integrally formed with a wheel mounting flange on its one end. A cylindrical portion axially extends from the wheel mounting flange. The inner ring is press fit onto the cylindrical portion of the wheel hub. The wheel hub and the inner ring are formed on their outer circumferences with double row inner raceway surfaces that oppose the double row outer raceway surfaces. Double row rolling elements are contained between the inner and outer raceway surfaces of the inner and outer members. A magnetic encoder is mounted on the inner ring. Annular openings are formed by the inner and outer members. The openings are sealed by a seal mounted on an outer side end of the outer member and by a protecting cover. The inner ring is axially secured on the wheel hub under a predetermined bearing pre-pressure by a caulked portion. The caulked portion is formed by plastically deforming the end of the cylindrical portion of the wheel hub. The protecting cover is formed with a substantially dish-shaped configuration by press-forming a non-magnetic austenitic stainless steel sheet. The protecting cover includes a cylindrical fitting portion adapted to be fit onto the outer member. A disc-shaped shielding portion extends radially inward from the fitting portion. A bottom portion extends from the shielding portion, via an inclined portion, to close the inner side end of the inner member. The protecting cover is positioned to abut against a stepped portion formed on the end face on the inner circumference of the outer member. Thus, it is possible to increase the rigidity of the protecting cover due to its stepped and/or flanged cross-sectional configuration. Thus, this suppresses the deformation of the protecting cover if gravel or the like would strike the protecting cover. Accordingly, it is possible to improve the positioning accuracy of the protecting cover relative to the outer member and thus to perform the exact adjustment of air gap between the magnetic encoder and the sensor. Thus, this increases the reliability of the detection of the wheel speed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The present disclosure is a wheel bearing apparatus incorporating a wheel speed detecting apparatus including an outer member integrally formed, on its outer circumference, with a body mounting flange to be mounted on a knuckle of a vehicle. The outer member inner circumference includes double row outer raceway surfaces. An inner member includes a wheel hub and an inner ring. The wheel hub is integrally formed with a wheel mounting flange on its one end. The wheel hub outer circumference includes one inner raceway surface opposing one of the outer raceway surface. A cylindrical portion axially extends from the inner raceway surface. The inner ring is press fit onto the cylindrical portion of the wheel hub. The inner ring has an inner raceway surface opposing the other of the outer raceway surfaces. Double row rolling elements are contained between the inner and outer raceway surfaces of the inner and outer members. A magnetic encoder is mounted on the inner ring. Annular openings are formed between the inner and outer members. The openings are sealed by a seal mounted on an outer side end of the outer member and by a protecting cover. The inner ring is axially secured on the wheel hub under a predetermined bearing pre-pressure by a caulked portion formed by plastically deforming the end of the cylindrical portion of the wheel hub. The protecting cover is formed with a substantially dish-shaped configuration by press-forming a non-magnetic austenitic stainless steel sheet. The protecting cover includes a cylindrical fitting portion adapted to be fit onto the outer member. A disc-shaped shielding portion extends radially inward from the fitting portion. A bottom portion extends from the shielding portion, via an inclined portion, to close the inner side end of the inner member. A central recess is formed at the center of the bottom portion of the protecting cover so that it extends into a recess encircled by the caulked portion. The fitting portion is positioned to abut against a stepped portion formed on the end face or the inner circumference of the outer member. A recess, with an arcuate configuration, is formed in the shielding portion to contain a sensor therein so that the sensor is positionable nearer to the magnetic encoder.

Preferred embodiments of the present disclosure will be described with reference to accompanied drawings.

Figure 1:
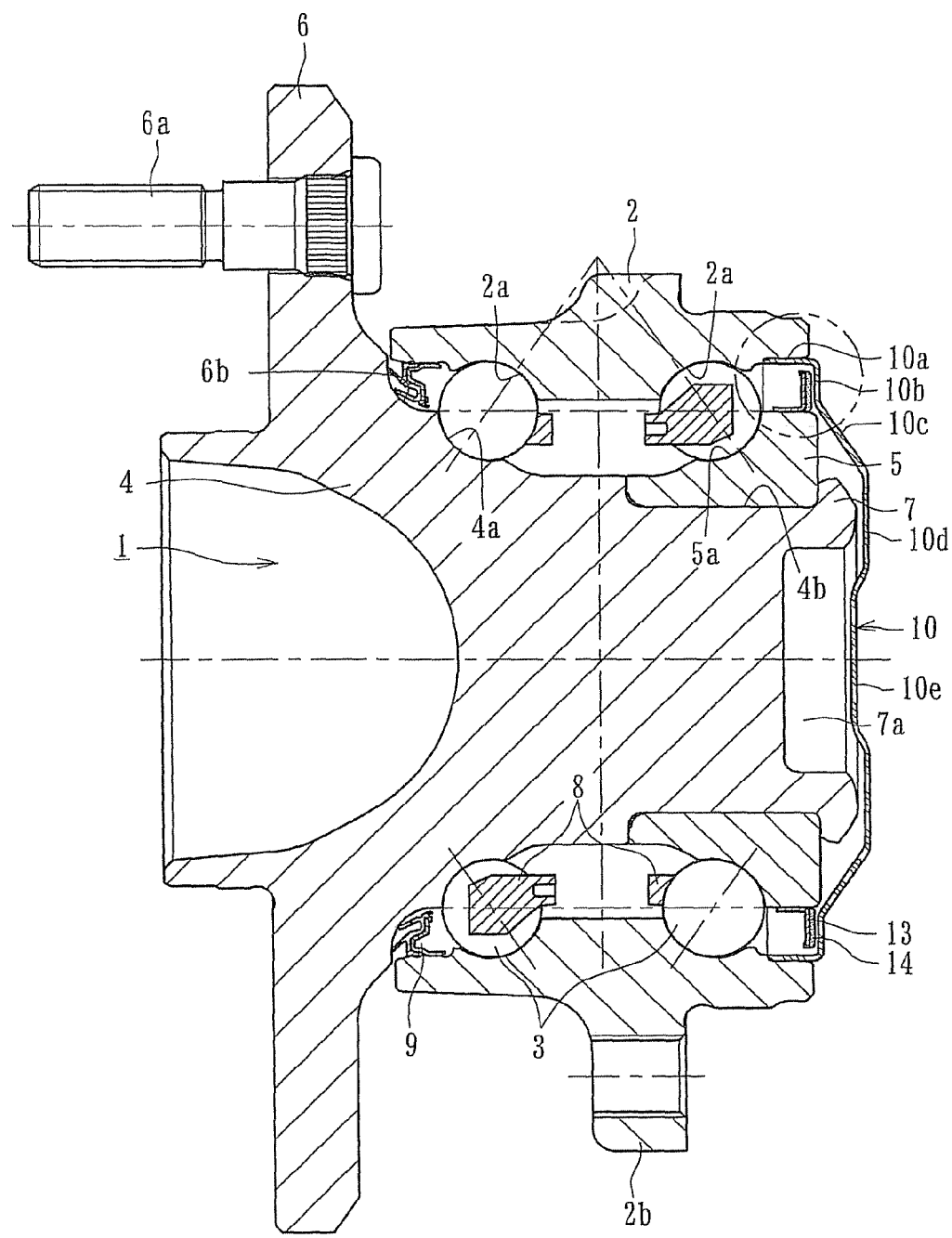
FIG. 1 is a longitudinal-section view of a first embodiment of a wheel bearing apparatus incorporating a wheel speed detecting apparatus.
Figure 2:
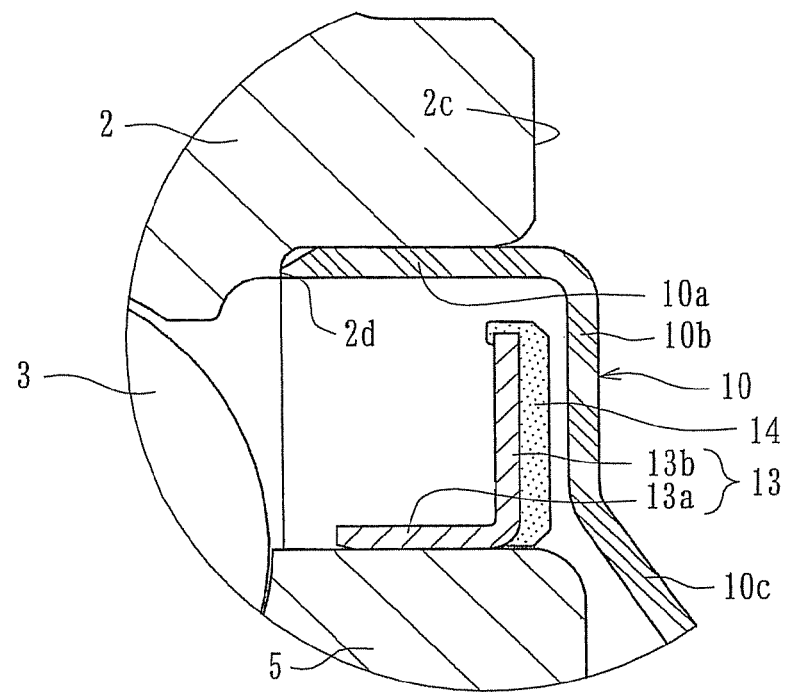
FIG. 2 is an enlarged partial view of a detecting portion of FIG. 1.
Figure 3:
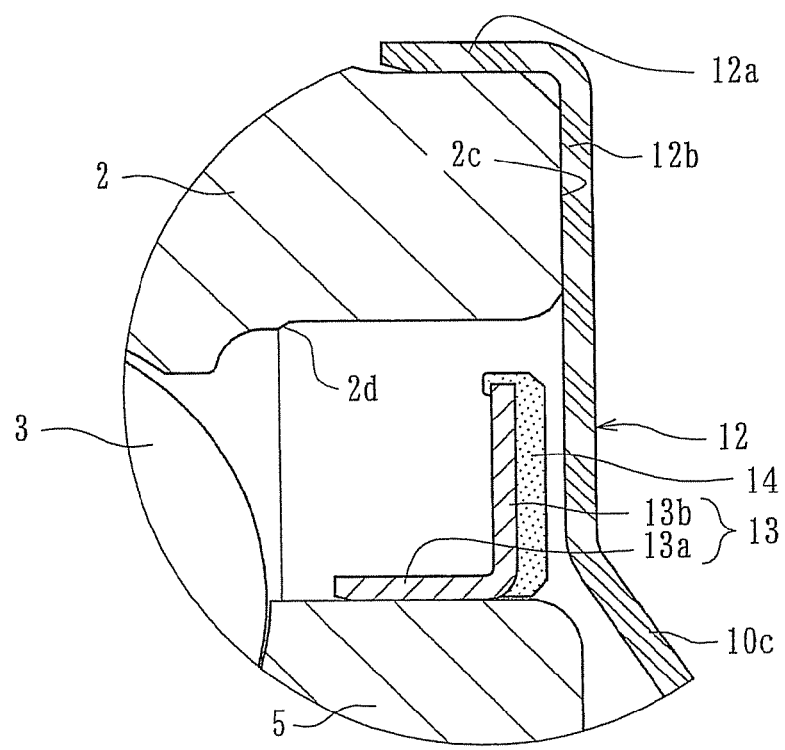
FIG. 3 is an enlarged partial view of a modification of the detecting portion of FIG. 2.

FIG. 1 is a longitudinal-section view of a first preferred embodiment of a wheel bearing apparatus incorporating a wheel speed detecting apparatus of the present disclosure. FIG. 2 is an enlarged partial view of a detecting portion of FIG. 1. FIG. 3 is an enlarged partial view of a modification of the detecting portion of FIG. 2. In the description below, an outer side of a bearing apparatus when it is mounted on a vehicle is referred to as the "outer side" (the left side in a drawing), and an inner side of the bearing apparatus, when it is mounted on a vehicle, is referred to as the "inner side" (the right side in a drawing).

The wheel bearing apparatus incorporating a wheel speed detecting apparatus of the present disclosure is a so-called "third generation" type. It includes an inner member 1, an outer member 2, and double row rolling elements (balls) 3 and 3 contained between the inner and outer members 1 and 2. The inner member 1 includes a wheel hub 4 and an inner ring 5 press-fit onto the wheel hub 4, via a predetermined interference.

The outer member 2 is made of medium carbon steel such as S53C including carbon of 0.40-0.80% by weight. The outer member 2 is integrally formed, on its outer circumference, with body mount flange 2b, that is adapted to be mounted on a knuckle (not shown). Also, the outer member inner circumference includes double row outer raceway surfaces 2a and 2a. These double row outer raceway surfaces 2a and 2a are hardened by high frequency induction quenching to have a surface hardness of 58-64 HRC.

The wheel hub 4 is integrally formed, on its outer side end, with a wheel mount flange 6 to mount a wheel (not shown). Hub bolts 6a are arranged on the wheel mounting flange 6 at circumferentially equidistant positions. In addition, the wheel hub 4 is formed, on its outer circumference, with one inner raceway surface 4a that corresponds to one (outer side) of the outer raceway surfaces 2a. A cylindrical portion 4b axially extends from the inner raceway surface 4a. The inner ring 5 is formed, on its outer circumference, with the other inner raceway surface 5a, that corresponds to the other (inner side) of the double row outer raceway surfaces 2a and 2a. The inner ring is press-fit onto the cylindrical portion 4b of the wheel hub 4 via a predetermined interference. The inner ring 4 is axially secured on the cylindrical portion 4b of the wheel hub 4 under a predetermined bearing pre-pressure by a caulked portion 7. The caulked portion 7 is formed by plastically deforming the end of the cylindrical portion 4b radially outward.

The double row rolling elements 3 and 3 are contained between the outer raceway surfaces 2a and 2a of the outer member 2 and the oppositely arranged inner raceway surfaces 4a and 5a. The rolling elements are rotatably held therein by cages 8 and 8. A seal 9 is mounted in an annular outer side opening formed between the outer member 2 and the inner member 1. A protecting cover 10 is mounted in an inner side opening. The seal and cover prevent leakage of grease contained within the bearing apparatus as well as preventing the entry of rain water or dust into the bearing.

Although shown here as a double row angular contact ball bearing using balls as the rolling elements 3, the present disclosure is not limited to such a bearing and may be applied to a double row tapered roller bearing using tapered rollers as rolling elements 3. In addition, although shown here as a bearing of the third generation type, where the inner raceway surface 4a is directly formed on the outer circumference of the wheel hub 4, the present disclosure can be applied to the first or second generation type bearings where a pair of inner rings are press-fit onto a cylindrical portion 4b of the wheel hub 4.

The wheel hub 4 is made of medium carbon steel such as S53C including carbon of 0.40-0.80% by weight. It is hardened by high frequency induction hardening to have a surface hardness of 58-64 HRC in a region including the inner raceway surface 4a, an inner side base portion 6b of the wheel mounting flange 6 and the cylindrical portion 4b of the wheel hub 4. Not only does this make it possible to improve the anti-abrasion characteristics of the base portion 6b, forming a seal land portion for the seal 9, but applies a sufficient mechanical strength to the wheel mounting flange 6 against rotary bending loads and thus improves the durability of the wheel hub 4. The caulked portion 7 is not quenched and remains as is with its surface hardness after forging. This makes the caulking process easy and possible to prevent generation of micro-cracks. The inner ring 5 and balls 3 are made of high carbon chrome steel such as SUJ2. They are hardened to their core by dip quenching to have a surface hardness of 58-64 HRC. The seal 9 is formed as an integrated seal with a metal core press-fit into the outer side end of the outer member 2 via a predetermined interference. The sealing member has a side lip.

A support ring 13, having a substantially "L" shaped cross-section, is press-fit onto the inner ring 5. As shown in FIG. 2, the support ring 13 includes a cylindrical portion 13a adapted to be press-fit onto the outer circumference of the inner ring 5. A standing portion 13b extends radially outward from the cylindrical portion 13a. A magnetic encoder 14 is integrally adhered to one side surface of the standing portion 13b, via vulcanizing adhesion. The magnetic encoder 14 is formed of a rubber magnet of synthetic rubber mingled with magnetic powder, such as ferrite, and has magnetic N and S poles alternately arranged along its circumference.

The support ring 13 is press-formed of ferromagnetic steel plate e.g. ferritic stainless steel sheet (JIS SUS 430 etc) or preserved cold rolled sheet (JIS SPCC etc). This makes it possible to prevent the generation of rust on the support ring 13, to increase the output of the magnetic encoder 14 and accordingly to keep stable detecting accuracy.

The protecting cover 10, mounted on the inner side end of the outer member 2, is press-formed from a non-magnetic austenitic stainless steel sheet (JIS SUS 304) to have a substantially dish-shaped configuration. The protecting cover 10 includes a cylindrical fitting portion 10a adapted to be press-fit and positioned onto the inner circumference of the outer member 2. A disc-shaped shielding portion 10b extends radially inward from the fitting portion 10a. A bottom portion 10d extends from the shielding portion 10b, via an inclined portion 10c, to close the inner side end of the inner member 1. The protecting cover 10 further includes a central recess 10e formed at the center of the bottom portion 10d of the protecting cover 10 so that it extends into a recess 7a encircled by the caulked portion 7 (see FIG. 1). A detecting portion of a sensor (not shown) is arranged so that it is closely positioned or abutting the shielding portion 10b of the protecting cover 10 so as to be opposed to the magnetic encoder 14 with a predetermined air gap (axial space), via the protecting cover 10. Since the protecting cover 10 is made of non-magnetic material, no influence is caused in a flux path and thus the accuracy of the sensor to detect the wheel speed is not detracted.

The rigidity of the protecting cover 10 can be increased by a bent or curved configuration such as the inclined portion 10c, central recessed portion 10e etc. Thus, it is possible to increase the rigidity of the protecting cover 10 and thus suppress its deformation if gravel or the like would strike the protecting cover 10. In addition, since the protecting cover 10 can be press-fit until its fitting portion 10a abuts against a stepped portion 2d (FIG. 2) of the outer member 2, it is possible to improve the positioning accuracy of the protecting cover 10 relative to the outer member 2. Thus, this provides a reliable wheel speed detection through an exact air gap adjustment.

In one modification, a protecting cover 12 can be mounted onto the outer circumference of the outer member 2 as shown in FIG. 3. This protecting cover 12 includes a cylindrical fitting portion 12a press-fit onto the outer circumference of the outer member 2. A shielding portion 12b extends radially inward from the fitting portion 12a and is adapted to be in close contact with the inner side end face 2c of the outer member 2. A bottom portion (not shown) extends from the shielding portion 12b, via an inclined portion 10c, and is adapted to close the inner side end of the inner member 1. Also, in this case, since the protecting cover 12 can be press-fit until the shielding portion 12b contacts the end face 2c of the outer member 2, it is possible to improve the positioning accuracy of the protecting cover 12 relative to the outer member 2.

Figure 4:
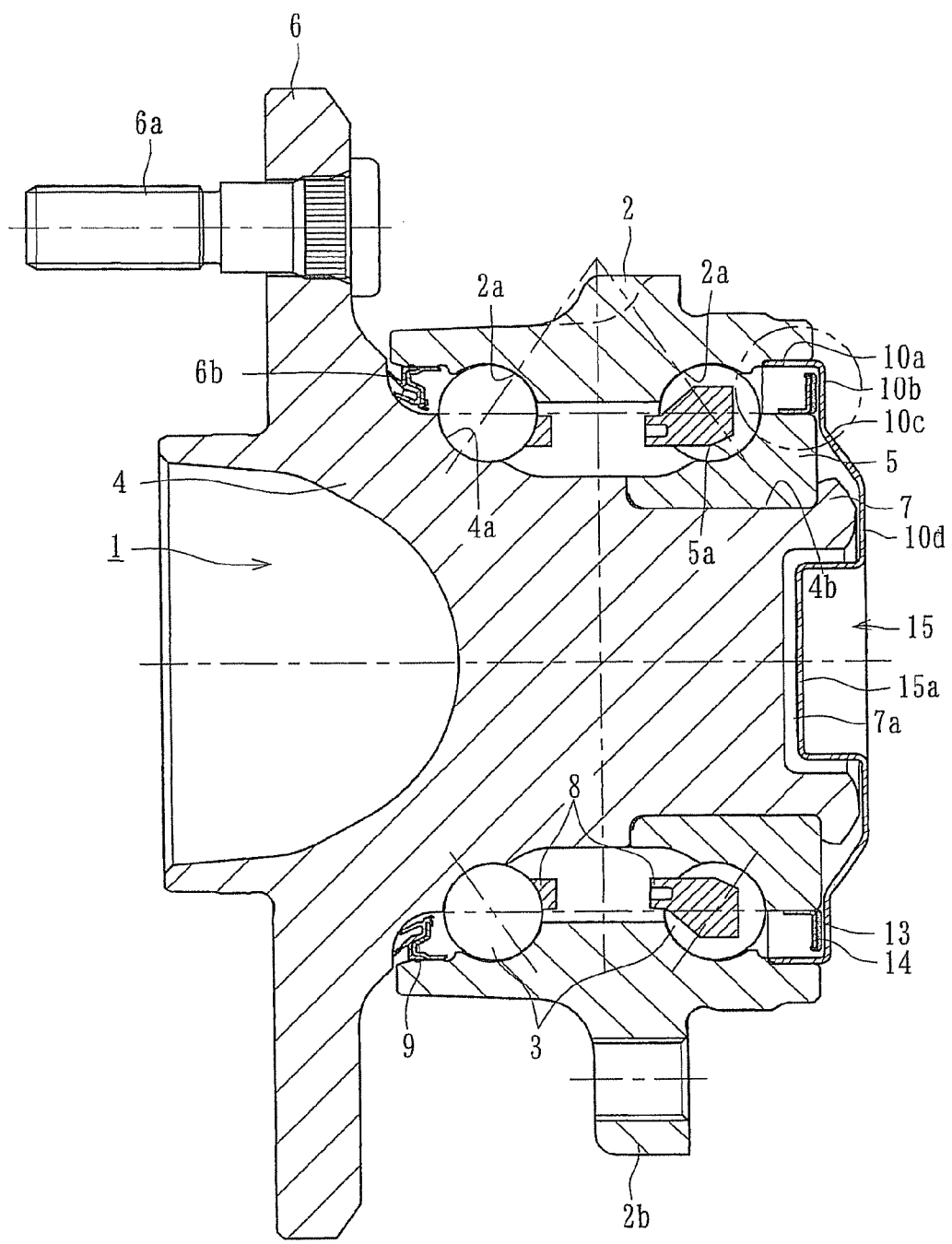
FIG. 4 is a longitudinal-section view of a second embodiment of a wheel bearing apparatus incorporating a wheel speed detecting apparatus.

FIG. 4 is a longitudinal-section view of a second embodiment of a wheel bearing apparatus incorporating a wheel speed detecting apparatus. This embodiment is basically different from the first embodiment (FIG. 1) only in a structure of the bottom portion of the protecting cover. Accordingly, the same reference numerals are used to identify parts or portions of this embodiment having same functions as those of the first embodiment.

A protecting cover 15 is mounted on the inner side end of the outer member 2. The protecting cover 15 is press-formed of non-magnetic austenitic stainless steel sheet (JIS SUS 304) to have a substantially dish-shaped configuration. The protecting cover 15 includes a cylindrical fitting portion 10a adapted to be press-fit into the inner circumference of the outer member 2. A shielding portion 10b extends radially inward from the fitting portion 10a. A bottom portion 10d extends from the shielding portion 10b, via an inclined portion 10c, to close the inner side end of the inner member 1. The protecting cover 15 further includes a central recess 15a formed at the center of the bottom portion 10d of the protecting cover 10. The central recess 15a extends into a recess 7a encircled by the caulked portion 7. The central recess 15a is formed to have a substantially rectangular cross-section along the configuration of the recess 7a encircled by the caulked portion 7. Thus, it is possible to further increase the rigidity of the protecting cover 15.

Figure 5:
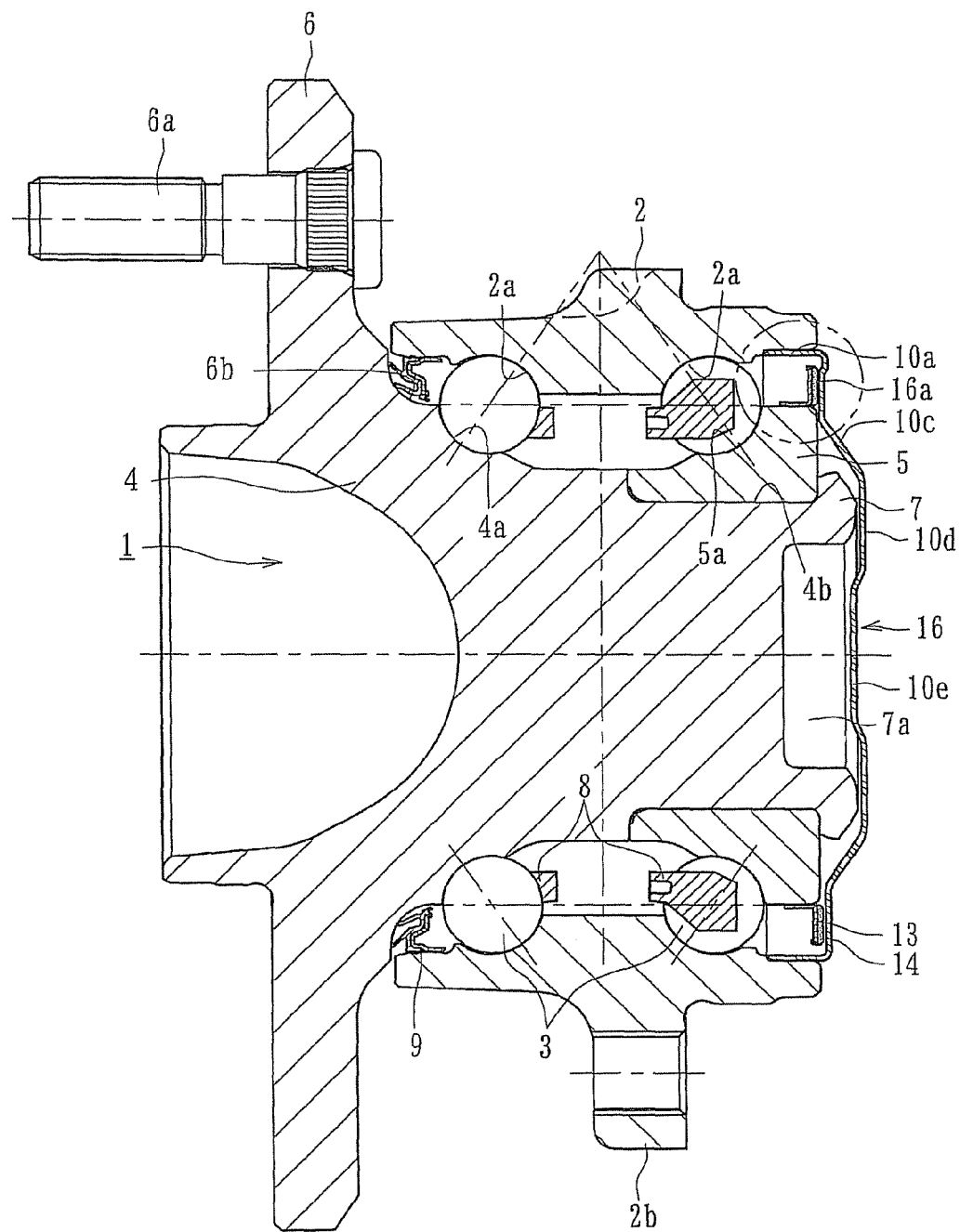
FIG. 5 is a longitudinal-section view of a third embodiment of a wheel bearing apparatus incorporating a wheel speed detecting apparatus.
Figure 6:
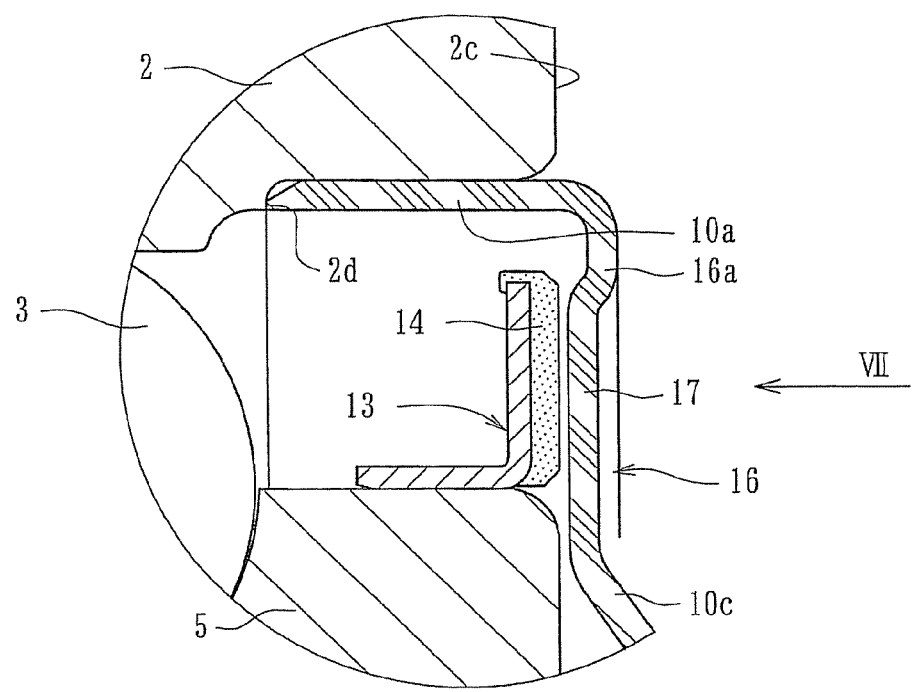
FIG. 6 is an enlarged partial view of a detecting portion of FIG. 5.
Figure 7:
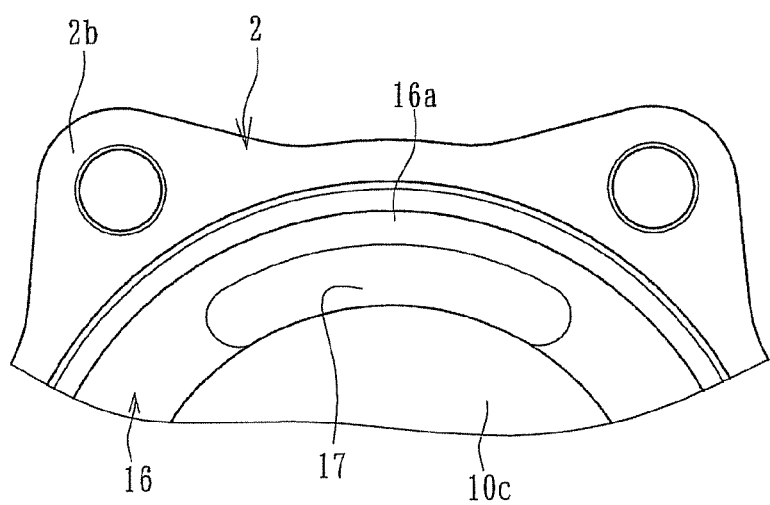
FIG. 7 is a partial front elevation view along an arrow VII in FIG. 6.

FIG. 5 is a longitudinal-section view of a third embodiment of a wheel bearing apparatus incorporating a wheel speed detecting apparatus. FIG. 6 is an enlarged partial view of a detecting portion of FIG. 5. FIG. 7 is a partial front elevation view from an arrow VII in FIG. 6. This embodiment is basically different from the first embodiment (FIG. 1) only in a structure of the shielding portion of the protecting cover. Accordingly, the same reference numerals are used to identify parts or portions of this embodiment having the same functions as those of the first embodiment.

A protecting cover 16 is mounted on the inner side end of the outer member 2. The protecting cover 16 is press-formed of non-magnetic austenitic stainless steel sheet (JIS SUS 304). It has a substantially dish-shaped configuration. The protecting cover 16 includes a cylindrical fitting portion 10a adapted to be press-fit into the inner circumference of the outer member 2. A disc-shaped shielding portion 16a extends radially inward from the fitting portion 10a. A bottom portion 10d extends from the shielding portion 16a, via an inclined portion 10c, to close the inner side end of the inner member 1. The protecting cover 16 further includes a central recess 10e formed at the center of the bottom portion 10d of the protecting cover 16. Thus, the central recess 10e extends into a recess 7a encircled by the caulked portion 7.

In this embodiment, an arcuate recess 17 is formed in the shielding portion 16a of the protecting cover 16. Thus, the recess 17 can be positioned proximately to the magnetic encoder 14. A sensor (not shown) can be arranged in this arcuate recess 17 to be adjacent or abut its bottom surface. This makes it possible to further increase the rigidity of the protecting cover 16. Thus, this prevents deformation of the cover 16 if gravel or the like would strike the protecting cover 16. In addition, it is also possible to set the air gap small. This improves the detecting accuracy. Furthermore, the arcuate recess 17 provides some error in accuracy during circumferential positioning of the protecting cover 16 relative to the sensor.

Figure 8:
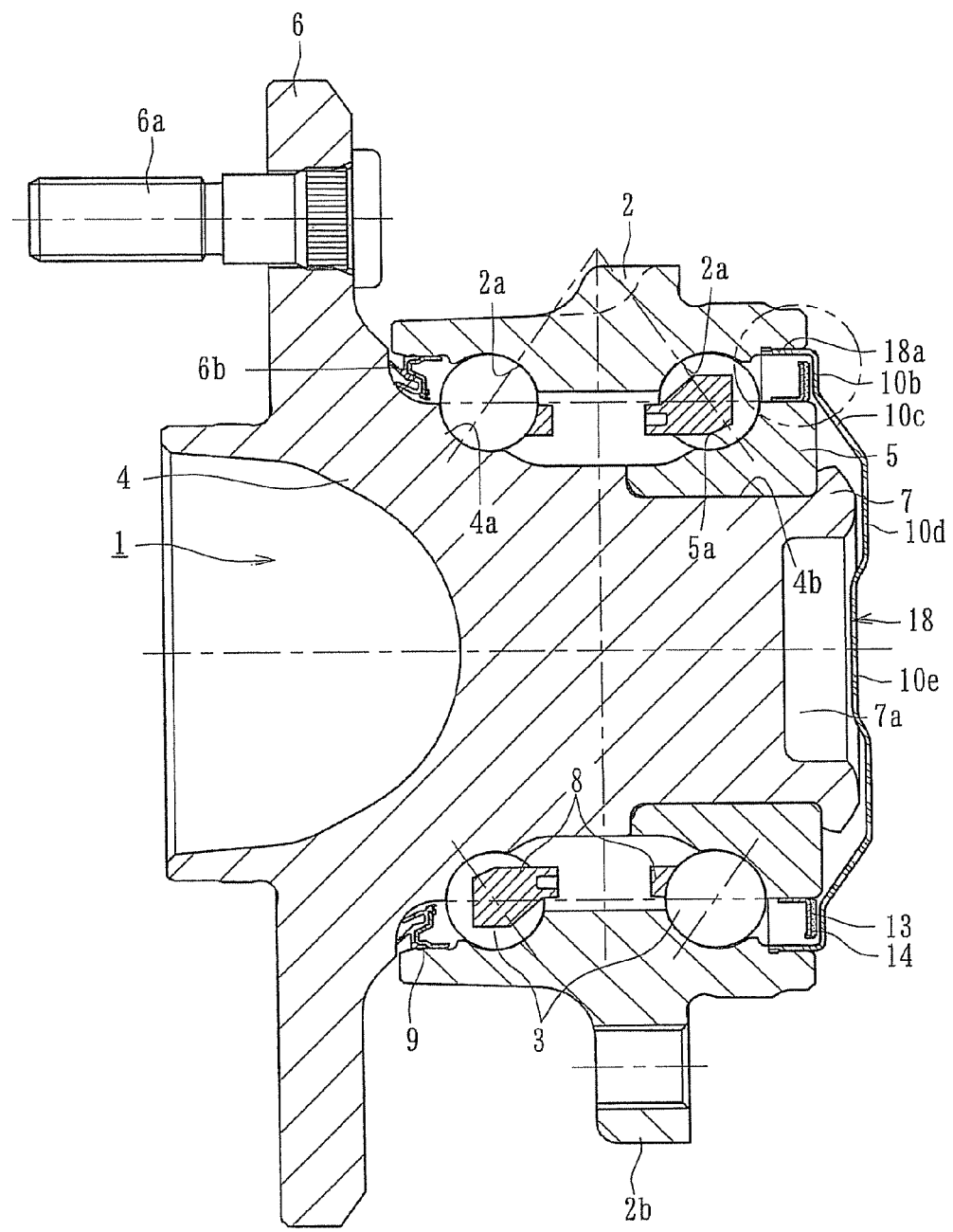
FIG. 8 is a longitudinal-section view of a fourth embodiment of a wheel bearing apparatus incorporating a wheel speed detecting apparatus.
Figure 9:
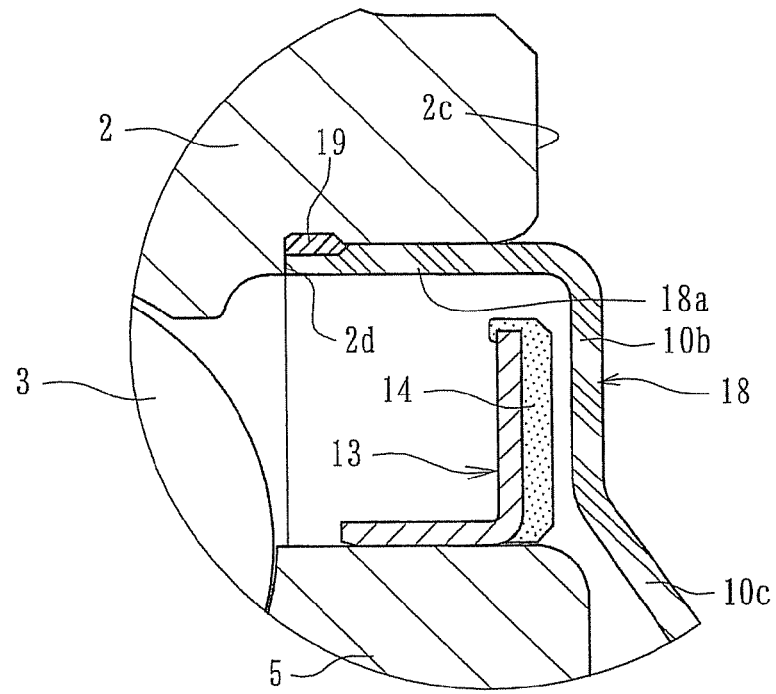
FIG. 9 is an enlarged partial view of a detecting portion of FIG. 8.
Figure 10:
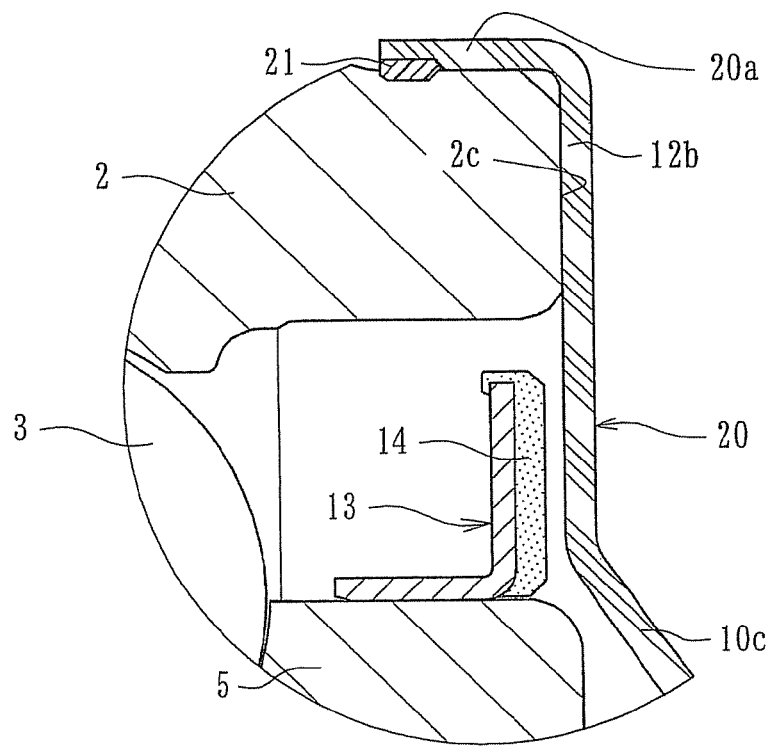
FIG. 10 is an enlarged partial view of a modification of the detecting portion of FIG. 9.

FIG. 8 is a longitudinal-section view of a fourth embodiment of a wheel bearing apparatus incorporating a wheel speed detecting apparatus. FIG. 9 is an enlarged partial view of a detecting portion of FIG. 8. FIG. 10 is an enlarged partial view of a modification of the detecting portion of FIG. 9. This embodiment is basically different from the first embodiment (FIG. 1) only in a structure of the fitting portion of the protecting cover. Accordingly, the same reference numerals are used to identify parts or portions of this embodiment having the same functions as those of the first embodiment.

A protecting cover 18 is mounted on the inner side end of the outer member 2. The protecting cover 18 is press-formed of non-magnetic austenitic stainless steel sheet (JIS SUS 304). The cover 18 has a substantially dish-shaped configuration. The protecting cover 18 includes a cylindrical fitting portion 18a adapted to be press-fit into the inner circumference of the outer member 2. A disc-shaped shielding portion 10b extends radially inward from the fitting portion 18a. A bottom portion 10d extends from the shielding portion 10b, via an inclined portion 10c, to close the inner side end of the inner member 1. The protecting cover 18 further includes a central recess 10e formed at the center of the bottom portion 10d of the protecting cover 18. Thus, the recess 10e extends into a recess 7a encircled by the caulked portion 7.

In this embodiment an elastic member 19, of synthetic rubber, such as nitrile rubber, etc., is integrally adhered to the tip of the fitting portion 18a. The elastic member 19 is press-fit into the inner circumference of the inner side end of the outer member 2 as shown in an enlarged view of FIG. 9. This makes it possible to improve the sealability of the fitting portion of the protecting cover 18 relative to the outer member. Thus, this surely prevents prevent leakage of lubricating grease sealed within the bearing and entry of rain water or dust into the bearing.

In a modification shown in FIG. 10, a protecting cover 20 is press-fit onto the outer circumference of the outer member 2. The protecting cover 20 includes a cylindrical fitting portion 20a adapted to be press-fit onto the outer circumference of the outer member 2. A shielding portion 12b extends radially inward from the fitting portion 20a and is in close contact against the inner side end face 2c of the outer member 2. A bottom portion (not shown) extends from the shielding portion 12b, via an inclined portion 10c, to close the inner side end of the inner member 1. Similarly to the embodiment of FIG. 9, an elastic member 21, of synthetic rubber such as nitrile rubber, etc., is integrally adhered to the tip of the fitting portion 20a. The elastic member 21 is press-fit onto the outer circumference of the outer member 2. This improves sealability of the protecting cover 20 relative to the outer member 2.

It is possible to apply an adhesive agent used for the vulcanized adhesion of the elastic member 19 or 21 to the whole surface of the protecting cover 18 or 20 or the surface to be fit onto the outer member 2 without using the elastic member 19 or 21. This also makes it possible to improve the sealability of the fitting portion of the protecting cover 18 or 20 relative to the outer member 2.

Figure 11:
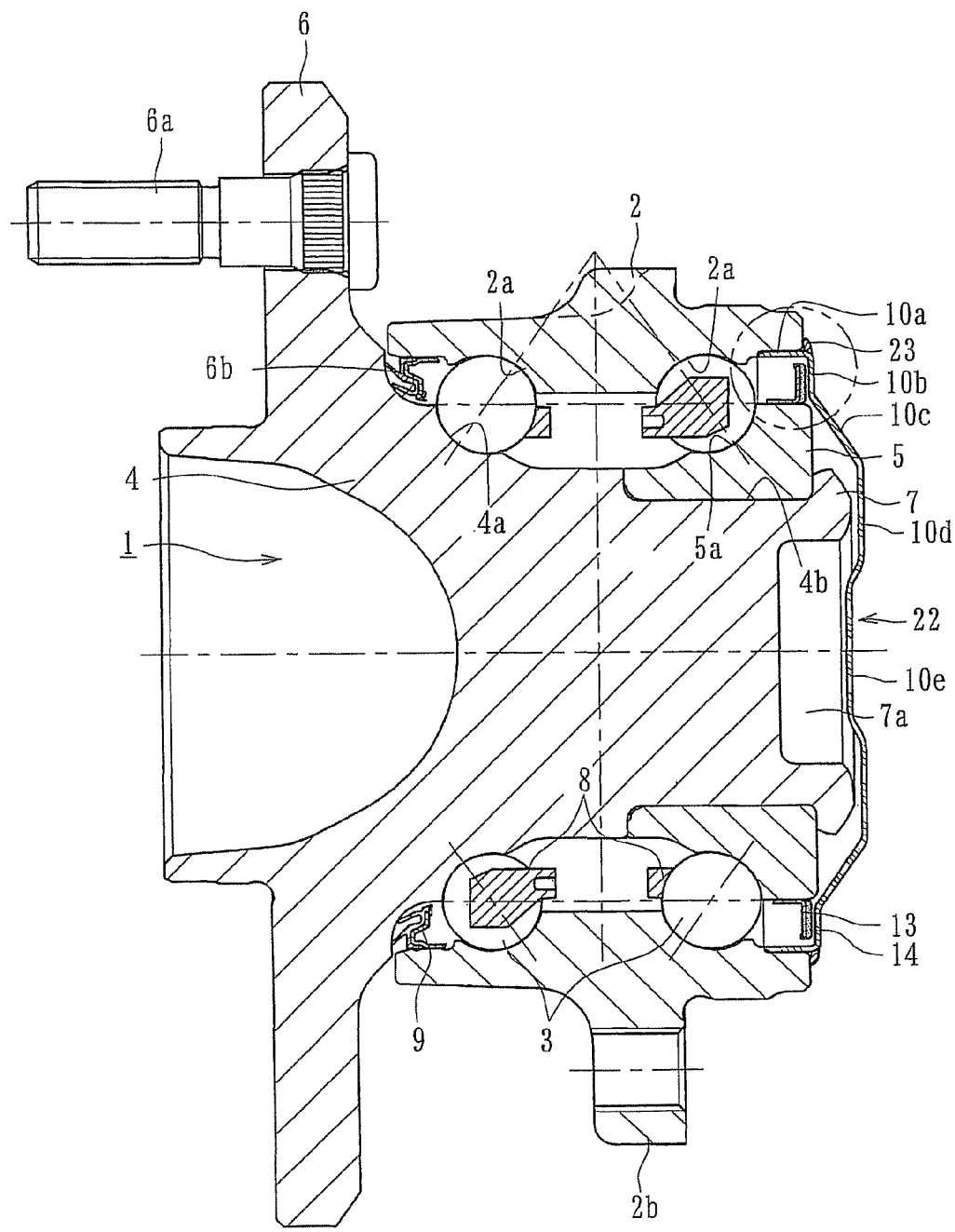
FIG. 11 is a longitudinal-section view of a fifth embodiment of a wheel bearing apparatus incorporating a wheel speed detecting apparatus.
Figure 12:
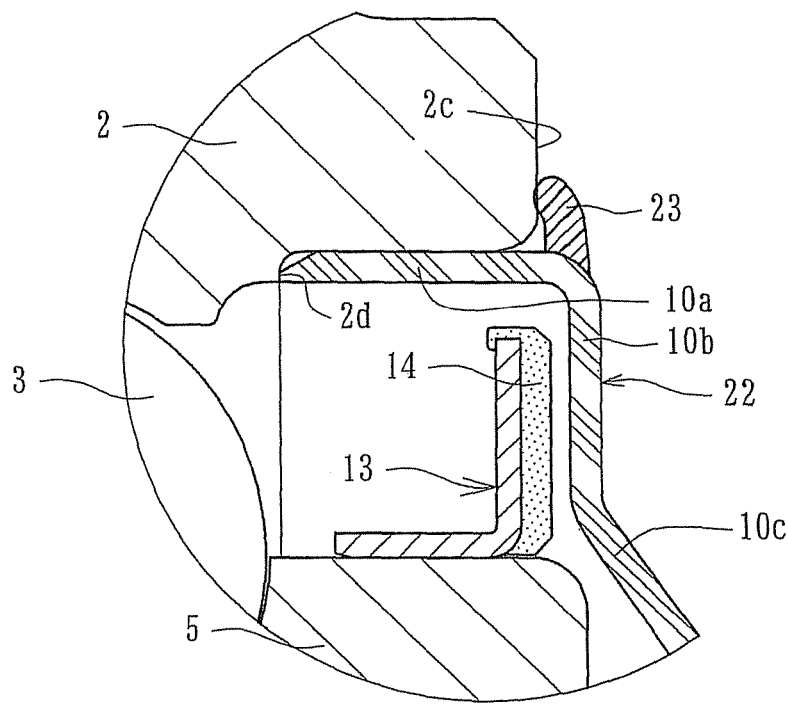
FIG. 12 is an enlarged partial view of a detecting portion of FIG. 11.
Figure 13:
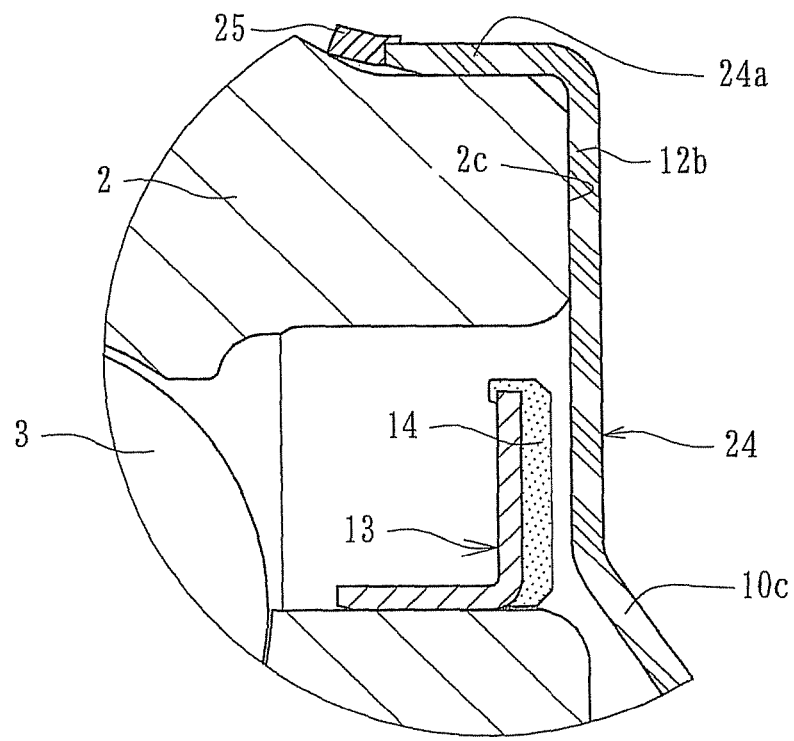
FIG. 13 is an enlarged partial view of a modification of the detecting portion of FIG. 12.

FIG. 11 is a longitudinal-section view of a fifth embodiment of a wheel bearing apparatus incorporating a wheel speed detecting apparatus. FIG. 12 is an enlarged partial view of a detecting portion of FIG. 11. FIG. 13 an enlarged partial view of a modification of the detecting portion of FIG. 12. This embodiment is basically different from the first embodiment (FIG. 1) only in part of a structure of the protecting cover. Accordingly, the same reference numerals are used to identify parts or portions of this embodiment that have the same functions as those of the first embodiment.

A protecting cover 22 is mounted on the inner side end of the outer member 2. The protecting cover 22 is press-formed of non-magnetic austenitic stainless steel sheet (JIS SUS 304). It has a substantially dish-shaped configuration. The protecting cover 22 includes a cylindrical fitting portion 10a adapted to be press-fit into the inner circumference of the outer member 2. A disc-shaped shielding portion 10b extends radially inward from the fitting portion 10a. A bottom portion 10d extends from the shielding portion 10b, via an inclined portion 10c, to close the inner side end of the inner member 1. The protecting cover 22 further includes a central recess 10e formed at the center of the bottom portion 10d of the protecting cover 22. Thus, the recess 10e extends into a recess 7a encircled by the caulked portion 7.

In this embodiment, a sealing lip 23, of synthetic rubber such as nitrile rubber, etc., is integrally adhered to the cross or junction of the fitting portion 10a and the shielding portion 10b. The sealing lip 23 elastically contacts against the inner side end face 2c of the outer member 2. This makes it possible to improve the sealability of the fitting portion of the protecting cover 22 relative to the outer member. Thus, this surely prevents leakage of lubricating grease sealed within the bearing and entry of rain water or dust into the bearing.

In a modification shown in FIG. 13 a protecting cover 24 is press-fit onto the outer circumference of the outer member 2. The protecting cover 24 includes a cylindrical fitting portion 24a adapted to be press-fit onto the outer circumference of the outer member 2. A shielding portion 12b extends radially inward from the fitting portion 24a and is in close contact with the inner side end face 2c of the outer member 2. A bottom portion (not shown) extends from the shielding portion 12b, via an inclined portion 10c, to close the inner side end of the inner member 1. Similarly to the embodiment of FIG. 12, a sealing lip 25, of synthetic rubber such as nitrile rubber, etc., is integrally adhered to the tip of the fitting portion 24a. The sealing lip 25 elastically contacts against the outer circumference of the outer member 2. This improves sealability of the protecting cover 24 relative to the outer member 2. Also, it prevents falling-out of the sealing lip 25 from the protecting cover 24 during its press-fitting onto the outer member 2

Figure 14:
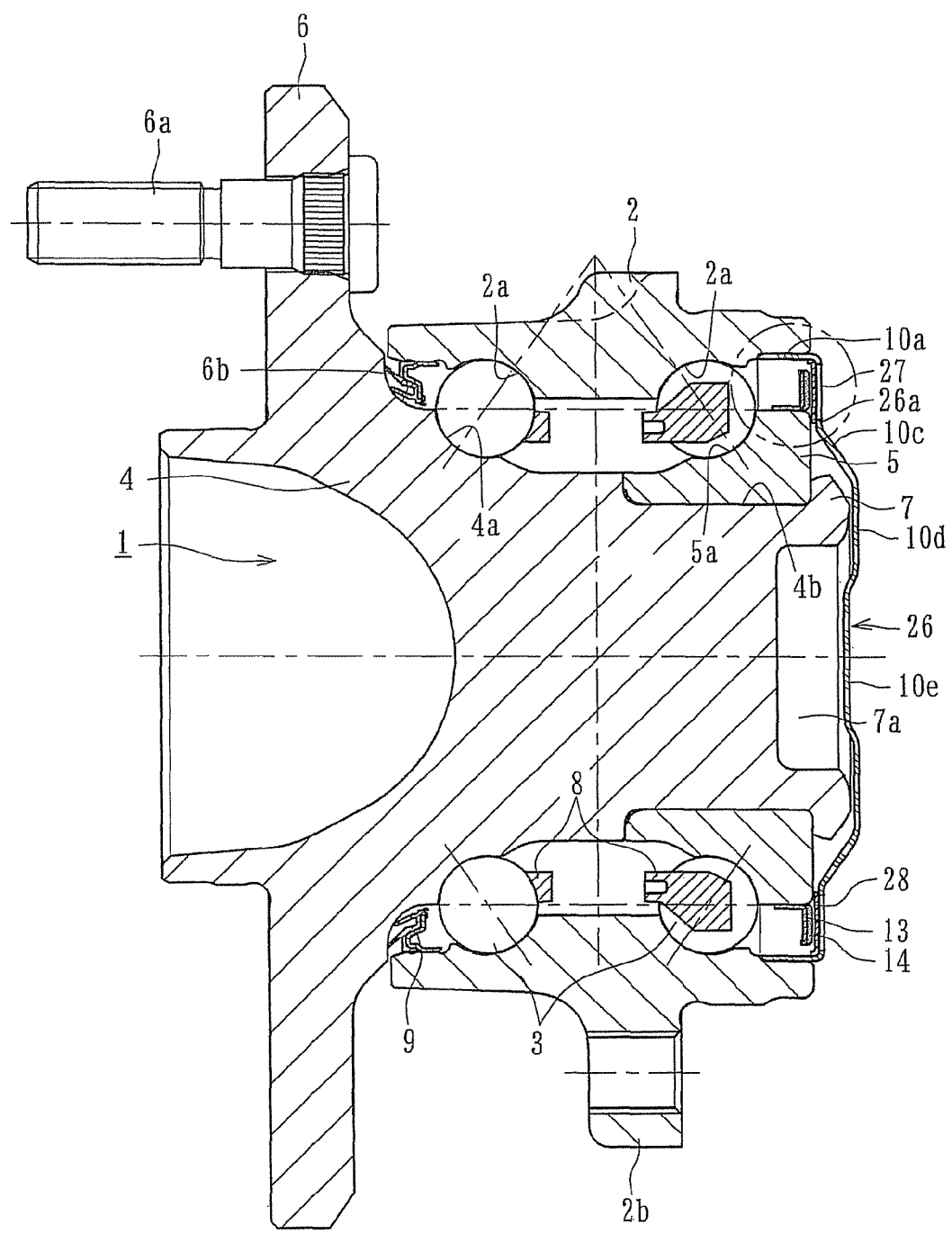
FIG. 14 is a longitudinal-section view of a sixth embodiment of a wheel bearing apparatus incorporating a wheel speed detecting apparatus.
Figure 15:
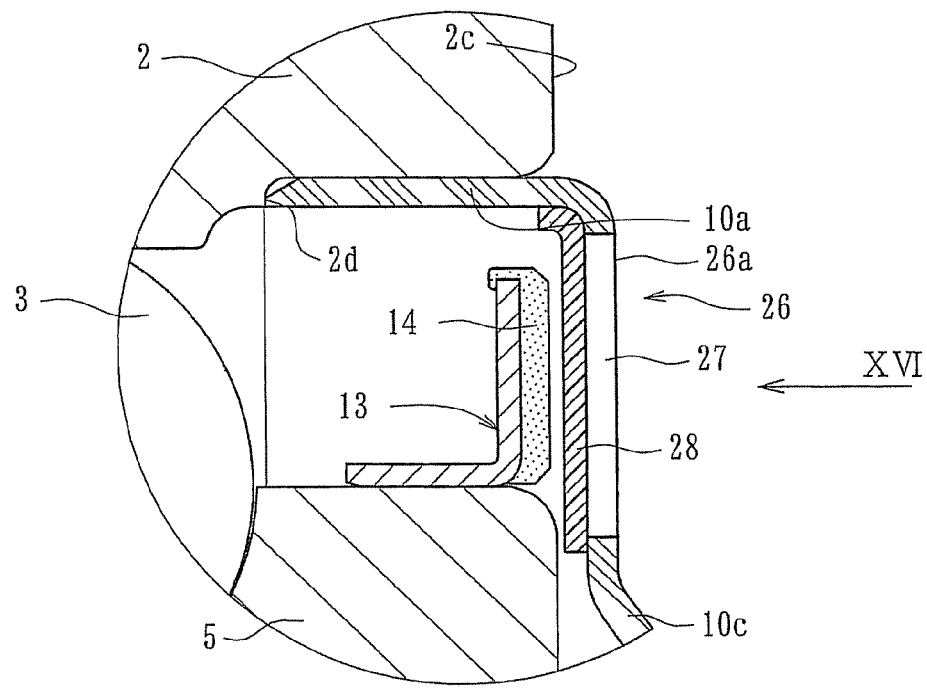
FIG. 15 is an enlarged partial view of a detecting portion of FIG. 14.
Figure 16:
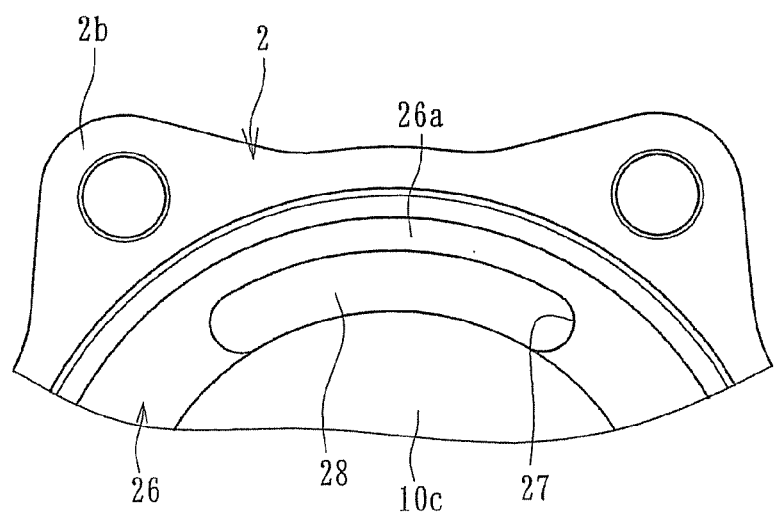
FIG. 16 is a partial front elevation view along an arrow XVI in FIG. 15.

FIG. 14 is a longitudinal-section view of a sixth embodiment of a wheel bearing apparatus incorporating a wheel speed detecting apparatus. FIG. 15 is an enlarged partial view of a detecting portion of FIG. 14. FIG. 16 is a partial front elevation view from an arrow XVI in FIG. 15. This embodiment is basically different from the first embodiment (FIG. 1) only in a structure of the shielding portion of the protecting cover. Accordingly, the same reference numerals are used to identify parts or portions of this embodiment that have the same functions as those of the first embodiment.

A protecting cover 26 is mounted on the inner side end of the outer member 2. The protecting cover 26 is press-formed of SPCC, SPCD or SPCE of cold rolled steel sheet (JIS SUS 304). The protecting cover 26 has a substantially dish-shaped configuration. In particular SPCD and SPCE are preferable in view of improved drawability. The protecting cover 26 includes a cylindrical fitting portion 10a adapted to be press-fit into the inner circumference of the outer member 2. A disc-shaped shielding portion 26a extends radially inward from the fitting portion 10a. A bottom portion 10d extends from the shielding portion 26a, via an inclined portion 10c, to close the inner side end of the inner member 1. The protecting cover 26 further includes a central recess 10e formed at the center of the bottom portion 10d of the protecting cover 26. Thus, the central recess 10e extends into a recess 7a encircled by the caulked portion 7.

In this embodiment an arcuate through aperture 27 is formed in the shielding portion 26a of the protecting cover 26. An elastic member 28, of synthetic rubber such as nitrile rubber to close the through aperture 27, is integrally adhered to the protecting cover 26 by vulcanizing adhesion, as shown in FIGS. 15 and 16. That is, the magnetic encoder 14 and a sensor (not shown) can be arranged opposite to each other via the elastic member 28. This allows some error in accuracy of both circumferential and axial positioning of the protecting cover 26 relative to the sensor. Thus, this insures desirable detecting accuracy. In addition, this allows use of cold rolled steel sheet, which is superior in deep drawability, without the use of expensive stainless steel. Thus, this enables a reduction in the manufacturing cost.

Figure 17:
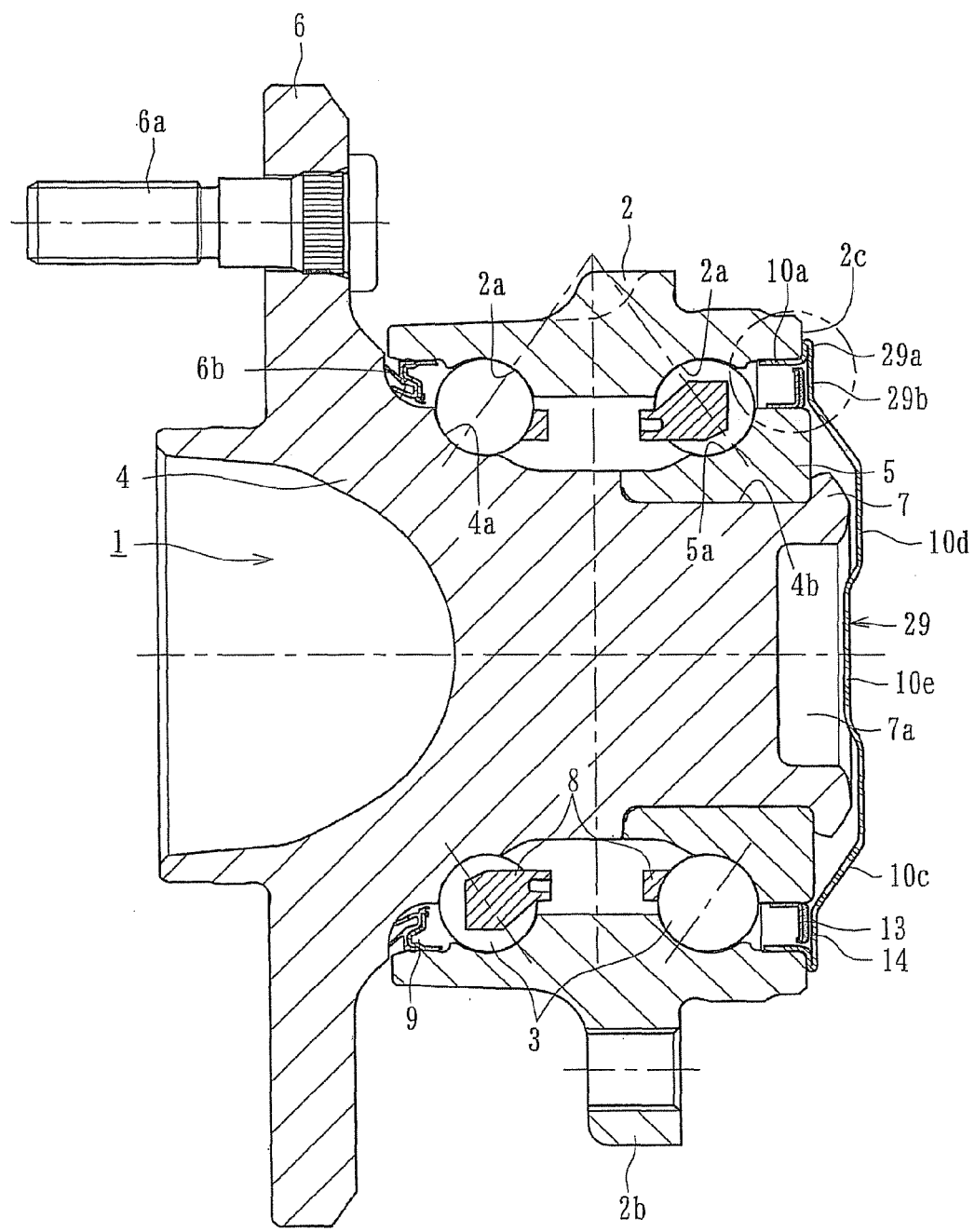
FIG. 17 is a longitudinal-section view of a seventh embodiment of a wheel bearing apparatus incorporating a wheel speed detecting apparatus.
Figure 18:
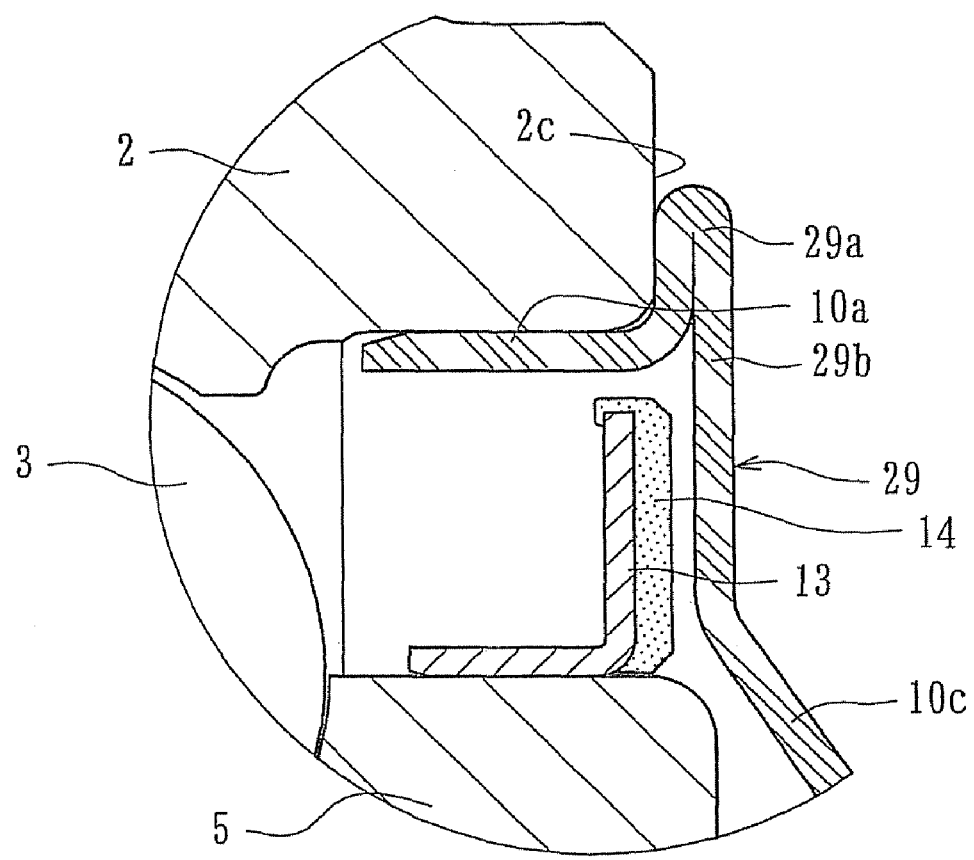
FIG. 18 is an enlarged partial view of a detecting portion of FIG. 17.

FIG. 17 is a longitudinal-section view of a seventh embodiment of a wheel bearing apparatus incorporating a wheel speed detecting apparatus. FIG. 18 is an enlarged partial view of a detecting portion of FIG. 17. This embodiment is basically different from the first embodiment (FIG. 1) only in a structure of the fitting portion of the protecting cover. Accordingly, the same reference numerals are used to identify parts or portions of this embodiment that have the same functions as those of the first embodiment.

In this embodiment a protecting cover 29 is press-formed of a non-magnetic austenitic stainless steel sheet (JIS SUS 304). It has a substantially dish-shaped configuration and includes a cylindrical fitting portion 10a adapted to be fit into the inner circumference of the outer member 2. A flange portion 29a, formed as a folded and stacked portion, extends radially outward from the fitting portion 10a. The flange portion 29a is adapted to be in close contact against the inner side end face 2c of the outer member 2. A disc-shaped shielding portion 29b extends radially inward from the flange portion 29a. A bottom portion 10d extends from the shielding portion 29b, via an inclined portion 10c, to close the inner side end of the inner member 1 (see FIG. 17). The protecting cover 29 further includes a central recess 10e formed at the center of the bottom portion 10d of the protecting cover 29. Thus, the central recess 10e extends into a recess 7a encircled by the caulked portion 7. A detecting portion of a sensor (not shown) can be arranged on the shielding portion 29b of the protecting cover 29 and be adjacent or abutted thereto. Thus, the detecting portion and the magnetic encoder 14 can oppose each other at a predetermined air gap (axial gap) via the protecting cover 29. In addition, since the protecting cover 29 is made of non-magnetic material, no influence is caused in a flux path. Thus, the accuracy of the sensor to detect the wheel speed is not detracted.

The rigidity of the protecting cover 29 can be increased by the flange portion 29a, formed as a folded and stacked portion, and the central recess 10e. Thus, it is possible to increase the rigidity of the protecting cover 29. Thus, this suppresses the cover deformation if gravel or the like would strike the protecting cover 29. In addition, since the protecting cover 29 can be press-fit until its flange portion 29a abuts against a inner side end face 2c of the outer member 2, it is possible to improve the positioning accuracy of the protecting cover 29 relative to the outer member 2. Thus, this provides a reliable wheel speed detection through an exact air gap adjustment.

Figure 19:
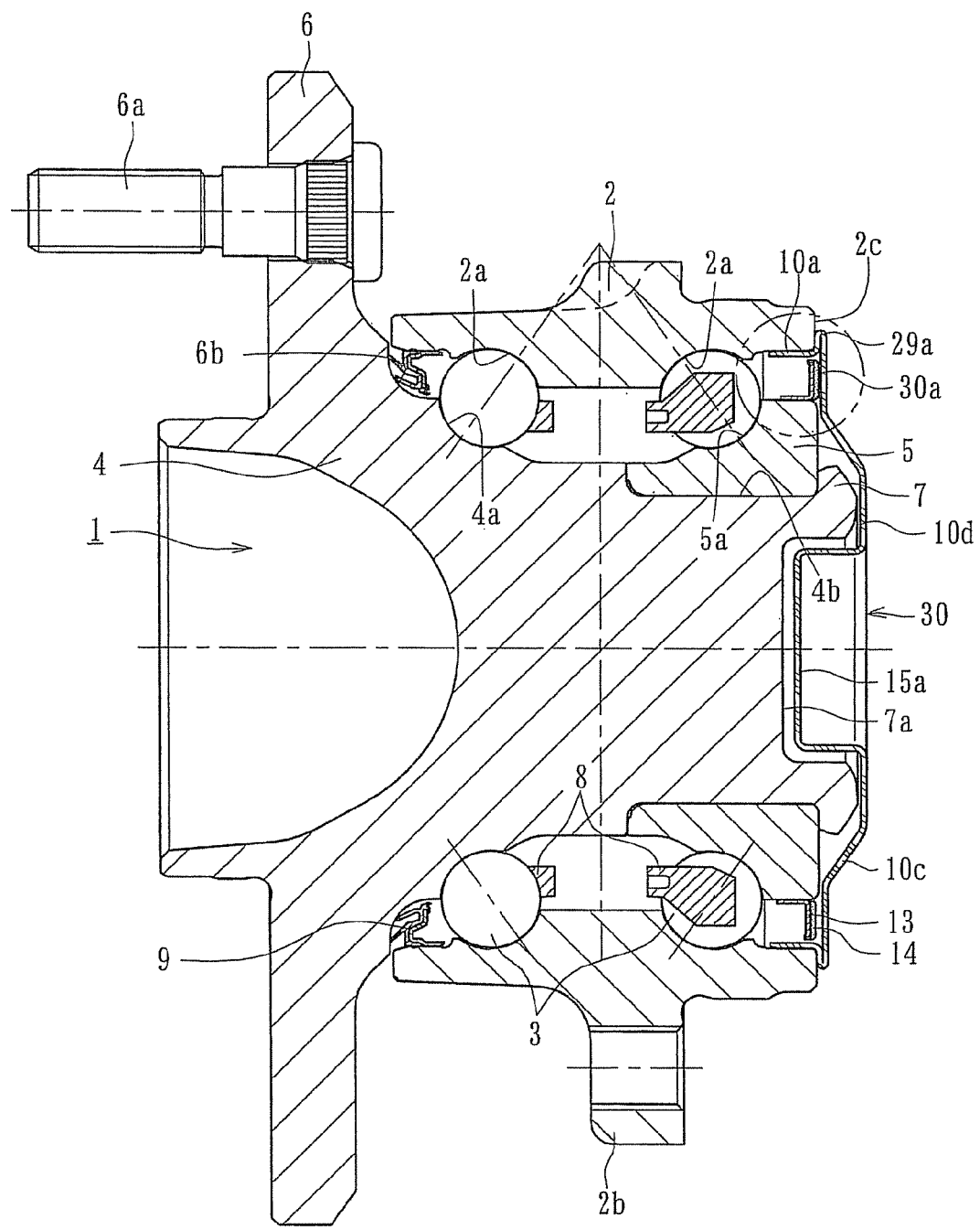
FIG. 19 is a longitudinal-section view of an eighth embodiment of a wheel bearing apparatus incorporating a wheel speed detecting apparatus.
Figure 20:
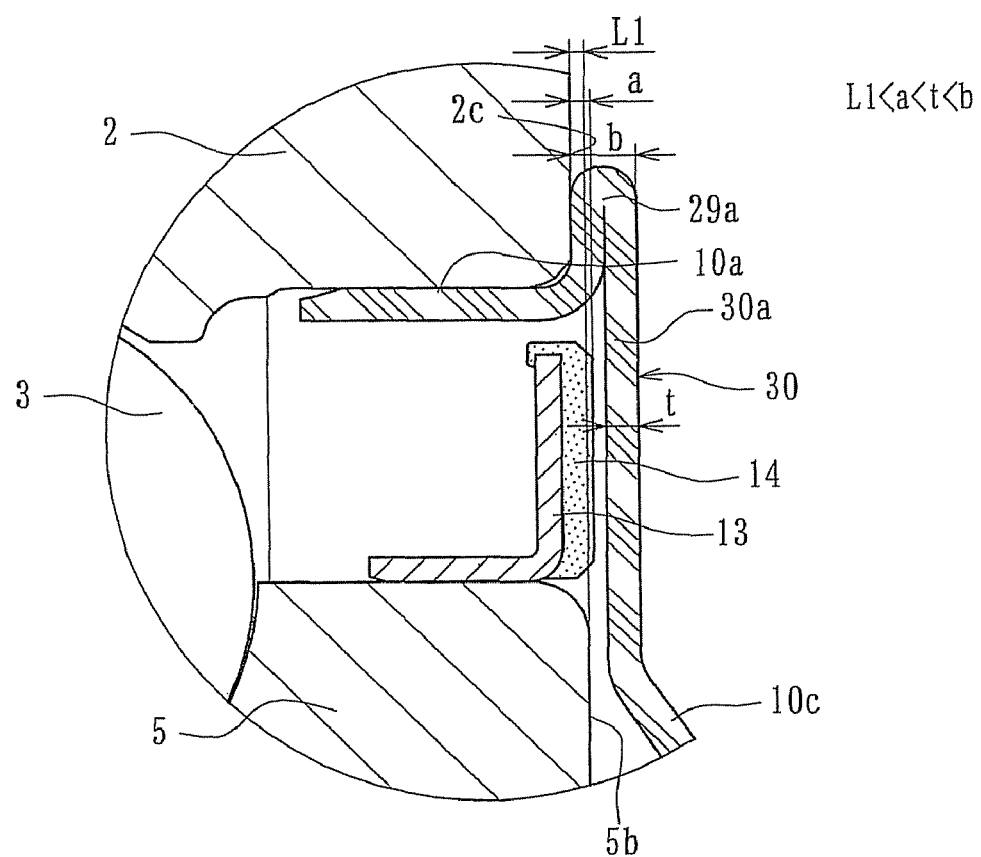
FIG. 20 is an enlarged partial view of a detecting portion of FIG. 19.

FIG. 19 is a longitudinal-section view of an eighth embodiment of a wheel bearing apparatus incorporating a wheel speed detecting apparatus. FIG. 20 is an enlarged partial view of a detecting portion of FIG. 19. This embodiment is basically different from the seventh embodiment (FIG. 17) only in a structure of the protecting cover. Accordingly, the same reference numerals are used to identify parts or portions of this embodiment that have the same functions as those of the seventh embodiment.

A protecting cover 30 is mounted on the inner side end of the outer member 2. The protecting cover 30 is press-formed of non-magnetic austenitic stainless steel sheet (JIS SUS 304). It has a substantially dish-shaped configuration. The protecting cover 30 includes a cylindrical fitting portion 10a adapted to be press-fit into the inner circumference of the outer member 2. A flange portion 29a is adapted to be in close contact against the inner side end face 2c of the outer member 2. A shielding portion 30a extends radially inward from the flange portion 29a. A bottom portion 10d extends from the shielding portion 30a, via an inclined portion 10c, to close the inner side end of the inner member 1.

In this embodiment a larger end face 5b of the inner ring 5 is arranged so that it projects toward the inner side from the inner side end face 2c by a predetermined length "L1". The detecting surface of the magnetic encoder 14 is arranged so that it projects from the inner side end face 2c of the outer member 2 by a length "a". This projected length "a" is set so that it is larger than the projected length "L1" and smaller than the thickness "t" of the protecting cover 30 (L1<a<t). This makes it possible to prevent the protecting cover 30 from abutting against the inner ring 5 and to set the air gap small to improve the detecting accuracy. The protecting cover 30 further includes a central recess 15a formed at the center of the bottom portion 10d of the protecting cover 30. The central recess 15a extends into a recess 7a encircled by the caulked portion 7. Since the central recess 15a is formed with a substantially rectangular cross-section along the configuration of the recess 7a encircled by the caulked portion 7, it is possible to further increase the rigidity of the protecting cover 30.

Furthermore, according to this embodiment, the rigidity of the protecting cover 30 can be increased by the folded and stacked flange portion 29a as well as the central recess 15a. Thus, it is possible to use a steel sheet for the protecting cover 30 that is thinner than a usual thickness of 0.8 mm e.g. within a range of 0.4-0.8 mm. This also improves the machining accuracy and setting of the air gap smaller.

Figure 21:
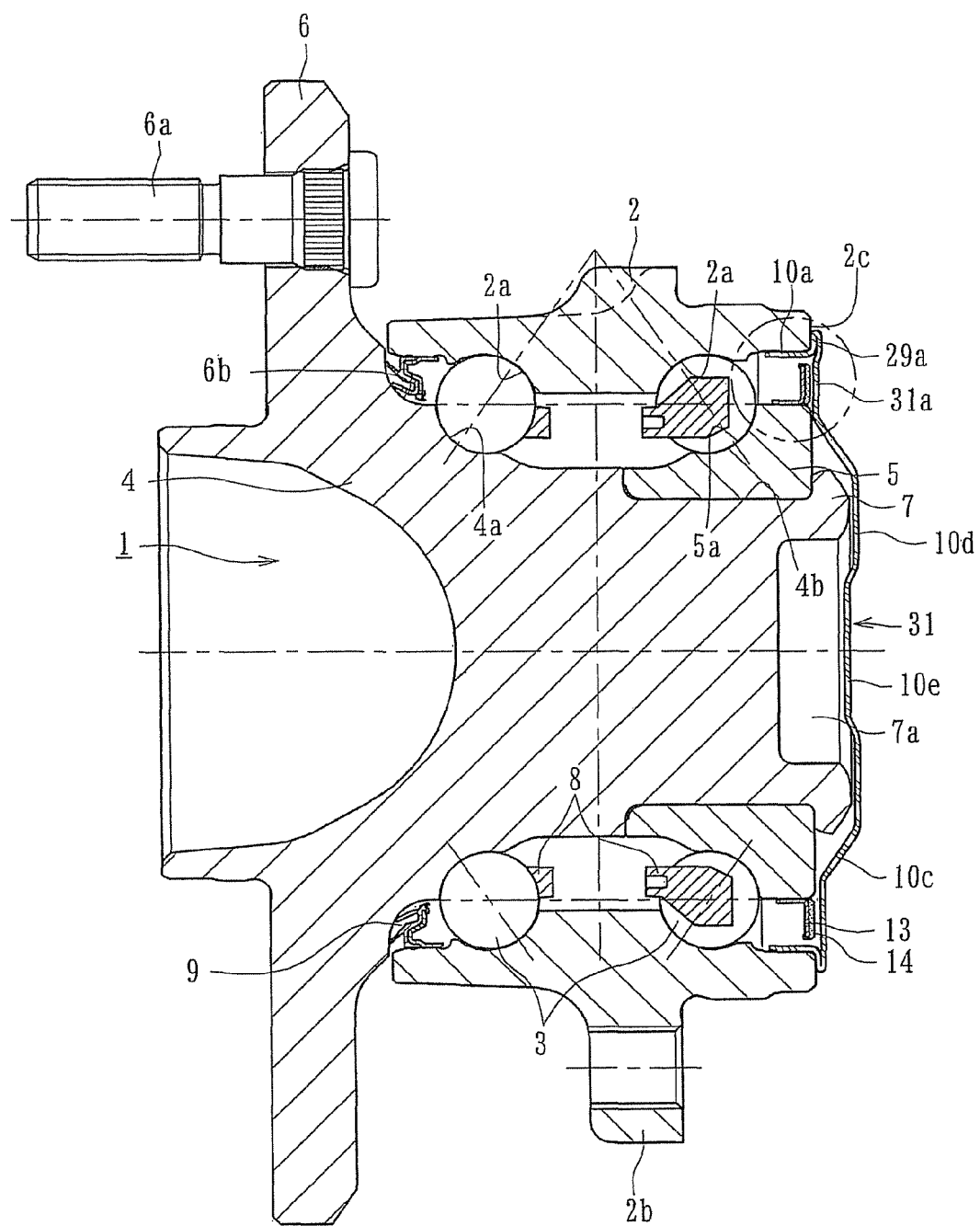
FIG. 21 is a longitudinal-section view of a ninth embodiment of a wheel bearing apparatus incorporating a wheel speed detecting apparatus.
Figure 22:
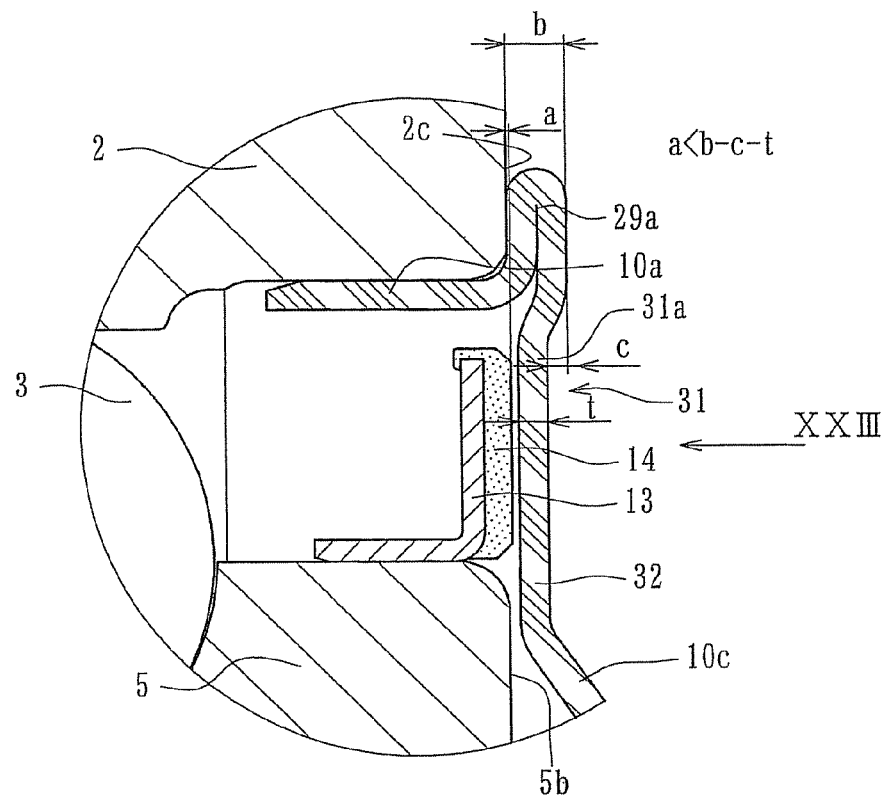
FIG. 22 is an enlarged partial view of a detecting portion of FIG. 21.
Figure 23:
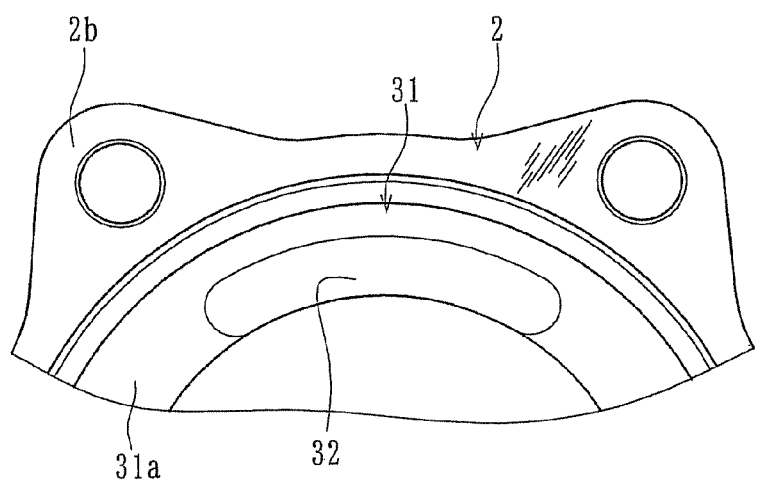
FIG. 23 is a partial front elevation view along an arrow XXIII in FIG. 22.

FIG. 21 is a longitudinal-section view of a ninth embodiment of a wheel bearing apparatus incorporating with a wheel speed detecting apparatus. FIG. 22 is an enlarged partial view of a detecting portion of FIG. 21. FIG. 23 is a partial front elevation view along arrow XXIII in FIG. 22. This embodiment is basically different from the seventh embodiment (FIG. 17) only in a structure of the shielding portion of the protecting cover. Accordingly, the same reference numerals are used to identify parts or portions of this embodiment that have the same functions as those of the seventh embodiment.

A protecting cover 31 is mounted on the inner side end of the outer member 2. The protecting cover 31 is press-formed of non-magnetic austenitic stainless steel sheet (JIS SUS 304). The cover 31 has a substantially dish-shaped configuration. The protecting cover 31 includes a cylindrical fitting portion 10a adapted to be press-fit into the inner circumference of the outer member 2. A flange portion 29a is adapted to be in close contact with the inner side end face 2c of the outer member 2. A shielding portion 31a extending radially inward from the flange portion 29a, and a bottom portion 10d extends from the shielding portion 31a, via an inclined portion 10c, to close the inner side end of the inner member 1.

In this embodiment, an arcuate recess 32 is formed in the shielding portion 31a of the protecting cover 31. The recess 32 can be positioned proximate to the magnetic encoder 14 by a distance "c". A sensor (not shown) can be arranged in this arcuate recess 32 and be adjacent or abutted to its bottom surface. This makes it possible to further increase the rigidity of the protecting cover 31. Thus, this prevents deformation if gravel or the like would strike the protecting cover 31 due to the arcuate configuration of the arcuate recess 32. In addition, it is also possible to increase the rigidity of the protecting cover 31 and to permit some error in accuracy during circumferential positioning of the protecting cover 31 relative to the sensor.

As shown in FIG. 22 the larger end face 5b of the inner ring 5 is arranged so that it is positioned flush with the inner side end face 2c of the outer member 2. The detecting surface of the magnetic encoder 14 is arranged so that it projects from the inner side end face 2c of the outer member 2 by an amount "a". This projected amount "a" is set so that it is smaller than a value obtained by subtracting an access enabling amount "c" (i.e. an amount "c" of the recess 32 enabling the sensor to be positioned nearer to the magnetic encoder 14) and the sheet thickness "t" from the thickness "b" of the flange portion 29a (i.e. a<(b−(c+t))). This makes it possible to prevent the contact of the protecting cover 31 against the inner ring 5. Also, it makes it possible to increase the rigidity of the protecting cover 31 to suppress its deformation if gravel or the like would strike the protecting cover. Additionally, it is possible to set the air gap small to improve the detecting accuracy.

Figure 24:
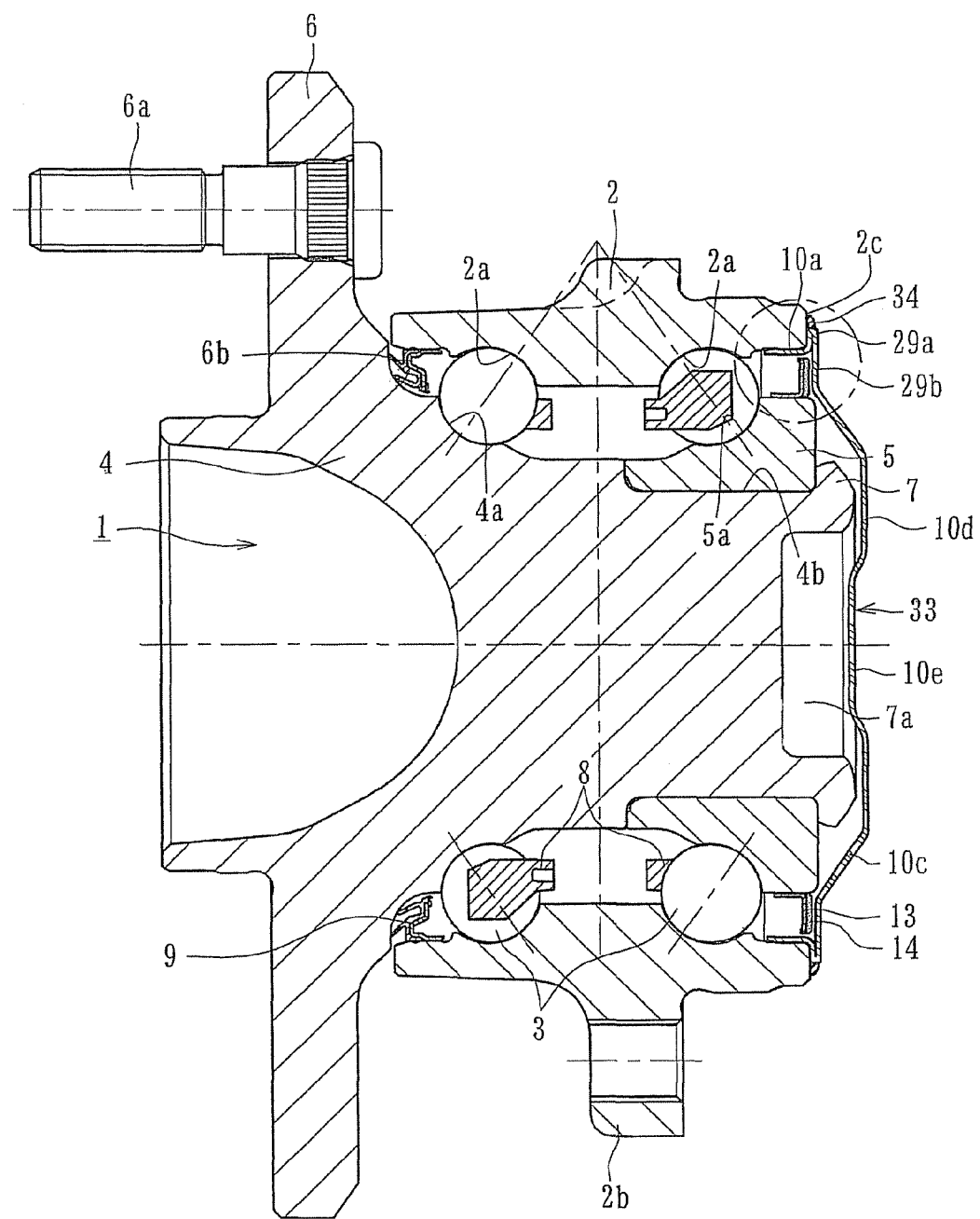
FIG. 24 is a longitudinal-section view of a tenth embodiment of a wheel bearing apparatus incorporating a wheel speed detecting apparatus.
Figure 25:
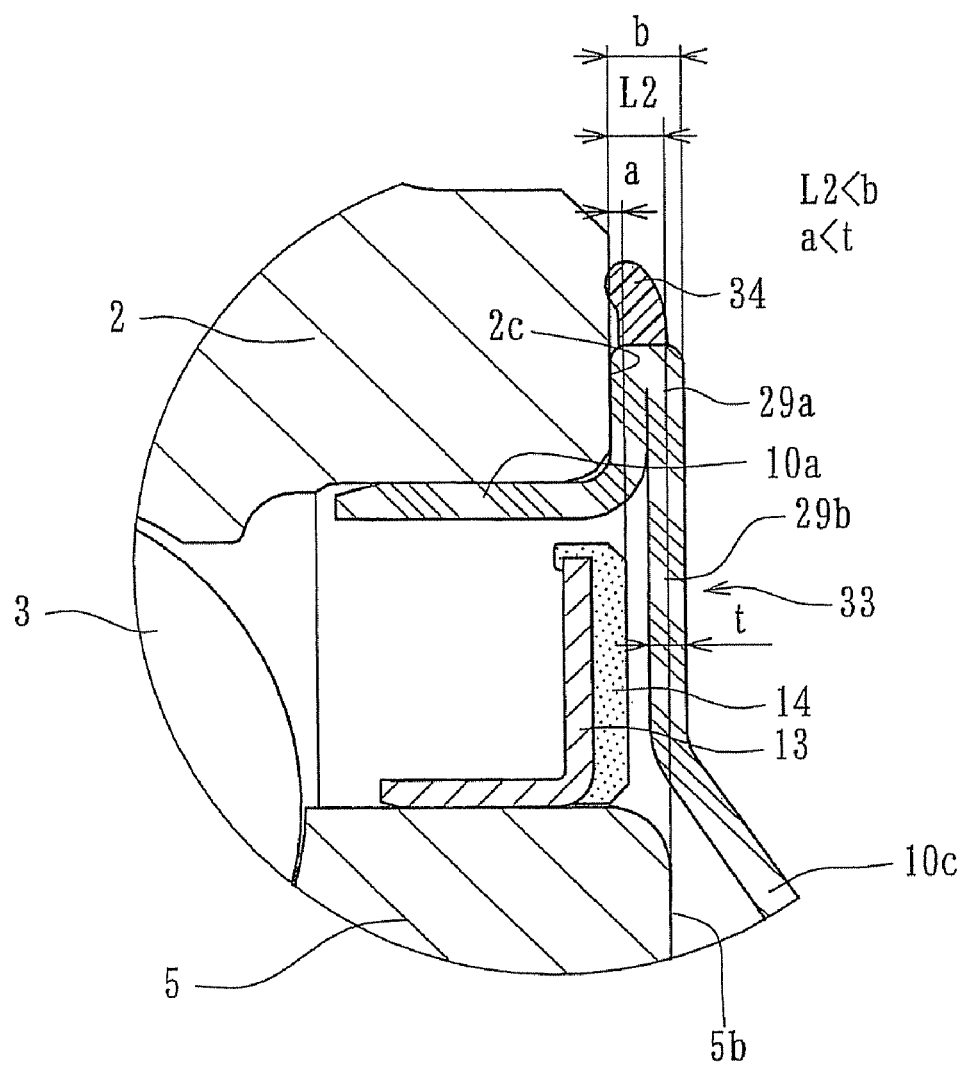
FIG. 25 is an enlarged partial view of a detecting portion of FIG. 24.

FIG. 24 is a longitudinal-section view of a tenth embodiment of a wheel bearing apparatus incorporating a wheel speed detecting apparatus. FIG. 25 is an enlarged partial view of a detecting portion of FIG. 24. This embodiment is basically different from the seventh embodiment (FIG. 17) only in a structure of the flange portion protecting cover. Accordingly, the same reference numerals are used to identify parts or portions of this embodiment that have the same functions as those of the seventh embodiment.

A protecting cover 33 is mounted on the inner side end of the outer member 2. The protecting cover 33 is press-formed of non-magnetic austenitic stainless steel sheet (JIS SUS 304). It has a substantially dish-shaped configuration. The protecting cover 33 includes a cylindrical fitting portion 10a adapted to be press-fit into the inner circumference of the outer member 2. A flange portion 29a is adapted to be in close contact with the inner side end face 2c of the outer member 2. A shielding portion 29b extends radially inward from the flange portion 29a. A bottom portion 10d extends from the shielding portion 29b, via an inclined portion 10c, to close the inner side end of the inner member 1.

In this embodiment the larger end face 5b of the inner ring 5 is arranged so that it projects from the inner side end face 2c of the outer member 2 toward the inner side by a predetermined length "L2" as shown in FIG. 25. The length "L2" is set so that it is larger than the thickness "t" of the protecting cover 33 and smaller than the thickness "b" of the flange portion 29a (i.e. t<L2<b). In addition, the detecting surface of the magnetic encoder 14 is arranged so that it projects from the inner side end face 2c of the outer member 2 by a length "a". This projected amount "a" is set smaller than the thickness "t" of the protecting cover 33 (i.e. a<t). A sealing lip 34, of synthetic rubber such as nitrile rubber, etc., is integrally adhered to the flange portion 29a of the protecting cover 33. The sealing lip 34 elastically contacts the inner side end face 2c of the outer member 2. This makes it possible to increase the rigidity of the protecting cover 33 and thus suppress its deformation if gravel or the like would strike the protecting cover 33. Also, it makes it possible to improve the sealability of the fitting portion 10a of the protecting cover 33 relative to the outer member 2. Thus, this surely prevents leakage of lubricating grease sealed within the bearing and entry of rain water or dust into the bearing.

It is also possible to apply an adhesive agent, used for the vulcanized adhesion of the seals, to the whole surface of the protecting cover 33 or the surface to be fit onto the outer member 2 with or without adhering the sealing lip 34. This also makes it possible to improve the sealability of the fitting portion of the protecting cover relative to the outer member 2.

Figure 26:
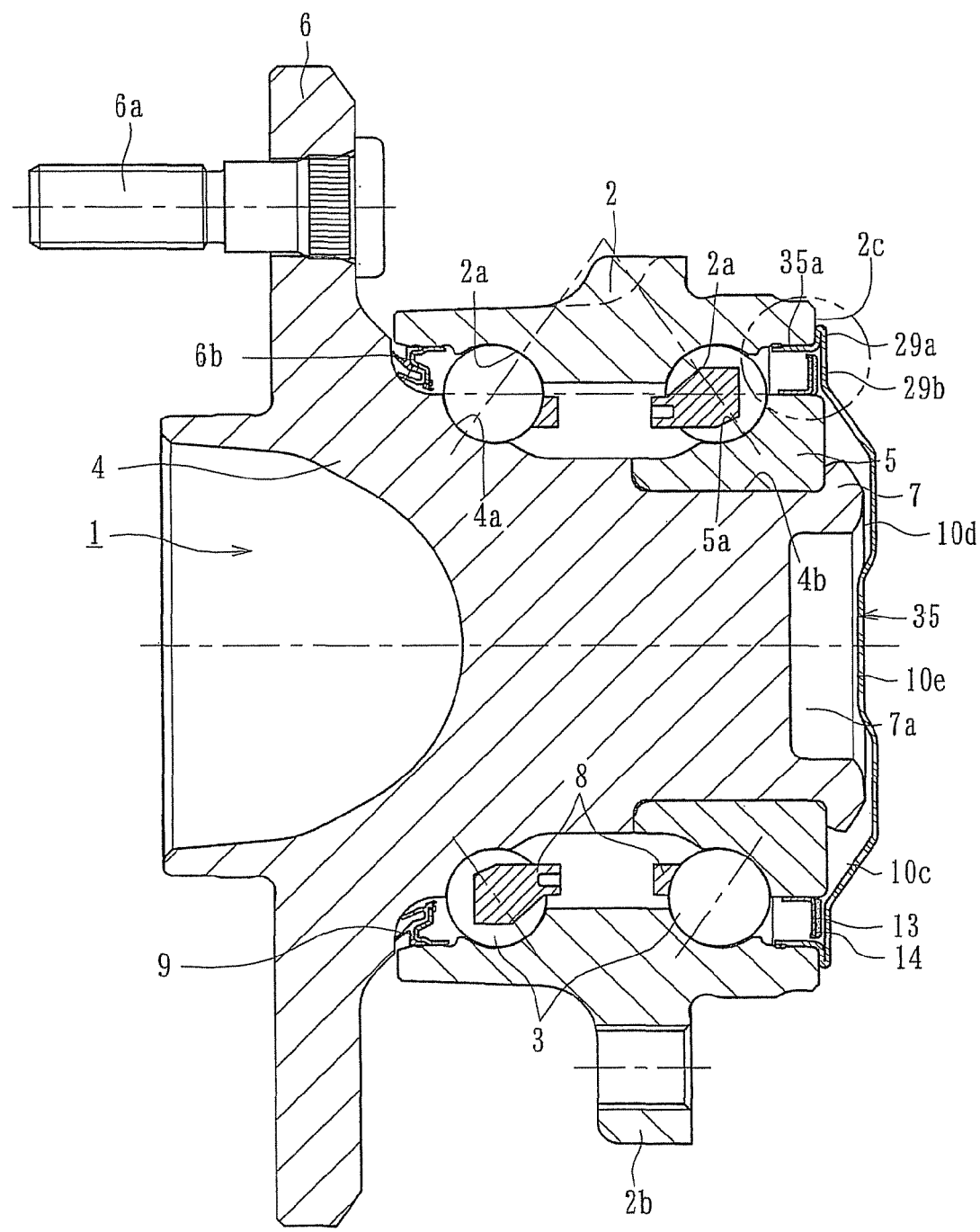
FIG. 26 is a longitudinal-section view of an eleventh embodiment of a wheel bearing apparatus incorporating a wheel speed detecting apparatus.
Figure 27:
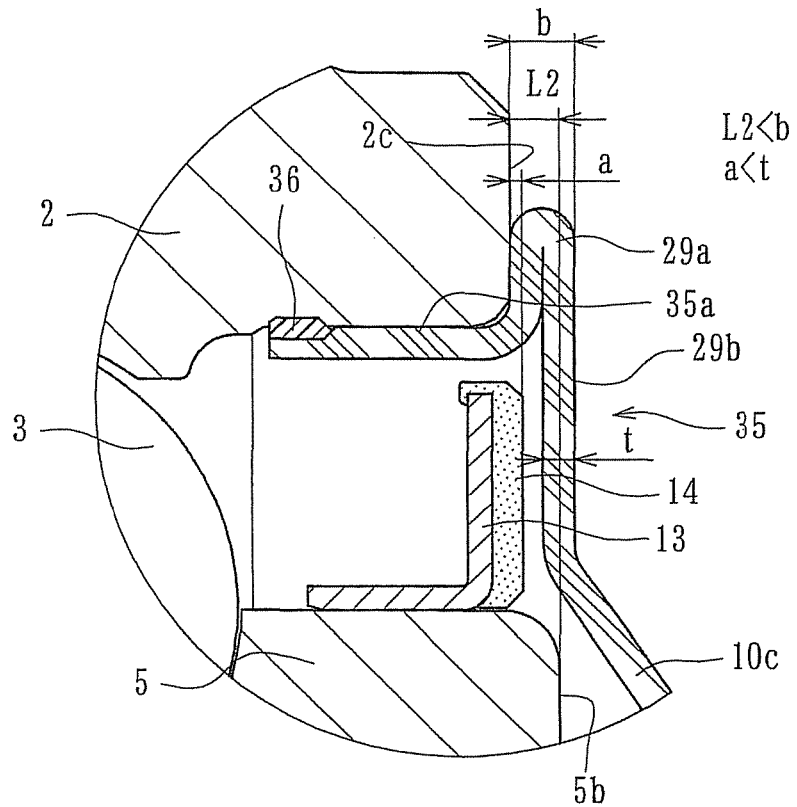
FIG. 27 is an enlarged partial view of a detecting portion of FIG. 26.

FIG. 26 is a longitudinal-section view of an eleventh embodiment of a wheel bearing apparatus incorporating a wheel speed detecting apparatus. FIG. 27 is an enlarged partial view of a detecting portion of FIG. 26. This embodiment is basically different from the seventh embodiment (FIG. 17) only in a structure of the fitting portion of the protecting cover. Accordingly, the same reference numerals are used to identify parts or portions of this embodiment that have the same functions as those of the seventh embodiment.

A protecting cover 35 is mounted on the inner side end of the outer member 2. The protecting cover 35 is press-formed of non-magnetic austenitic stainless steel sheet (JIS SUS 304). The protecting cover 35 has a substantially dish-shaped configuration. The protecting cover 35 includes a cylindrical fitting portion 35a adapted to be press-fit into the inner circumference of the outer member 2. A flange portion 29a is adapted to be in close contact with the inner side end face 2c of the outer member 2. A shielding portion 29b extends radially inward from the flange portion 29a. A bottom portion 10d extends from the shielding portion 29b, via an inclined portion 10c, to close the inner side end of the inner member 1.

In this embodiment the larger end face 5b of the inner ring 5 is arranged so that it projects from the inner side end face 2c of the outer member 2 toward the inner side by a predetermined length "L2". The detecting surface of the magnetic encoder 14 is arranged so that it projects from the inner side end face 2c of the outer member 2 by a length "a", as shown in FIG. 27. In this embodiment an elastic member 36, of synthetic rubber such as nitrile rubber, etc., is integrally adhered to the tip of the fitting portion 35a. The elastic member 36 is press-fit into the inner circumference of the inner side end of the outer member 2. This makes it possible to improve the sealability of the fitting portion 35a of the protecting cover 35 relative to the outer member 2. Thus, this surely prevents leakage of lubricating grease sealed within the bearing and entry of rain water or dust into the bearing.

Figure 28:
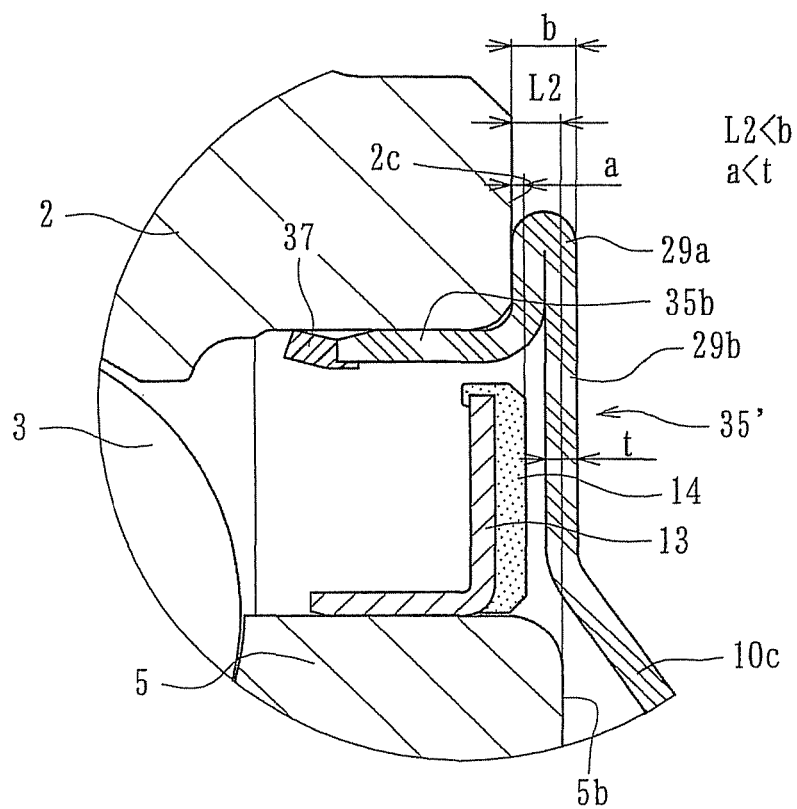
FIG. 28 is an enlarged partial view of a modification of the detecting portion of FIG. 27.

In one modification shown in FIG. 28 a sealing lip 37, of synthetic rubber such as nitrile rubber, etc., is integrally adhered to the tip of the fitting portion 35b. The sealing lip 37 elastically contacts the inner circumferential surface of the outer member 2. This makes it possible to improve the sealability of the fitting portion 35b of the protecting cover 35' relative to the outer member 2. Also, it simplifies the press-fitting operation of the protecting cover 35' to prevent falling-out of the sealing lip 37 from the protecting cover 35'.

Figure 29:
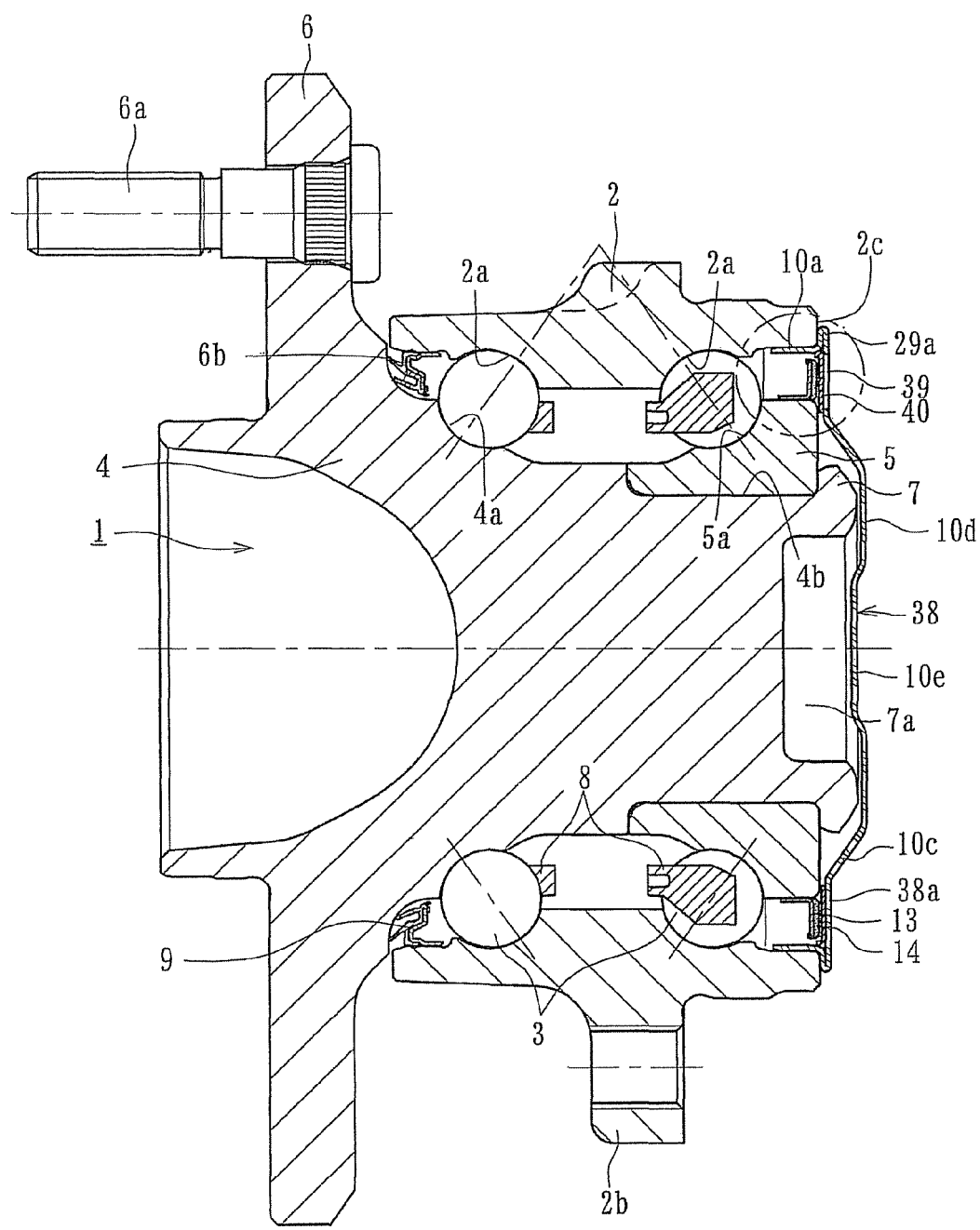
FIG. 29 is a longitudinal-section view of a twelfth embodiment of a wheel bearing apparatus incorporating a wheel speed detecting apparatus.
Figure 30:
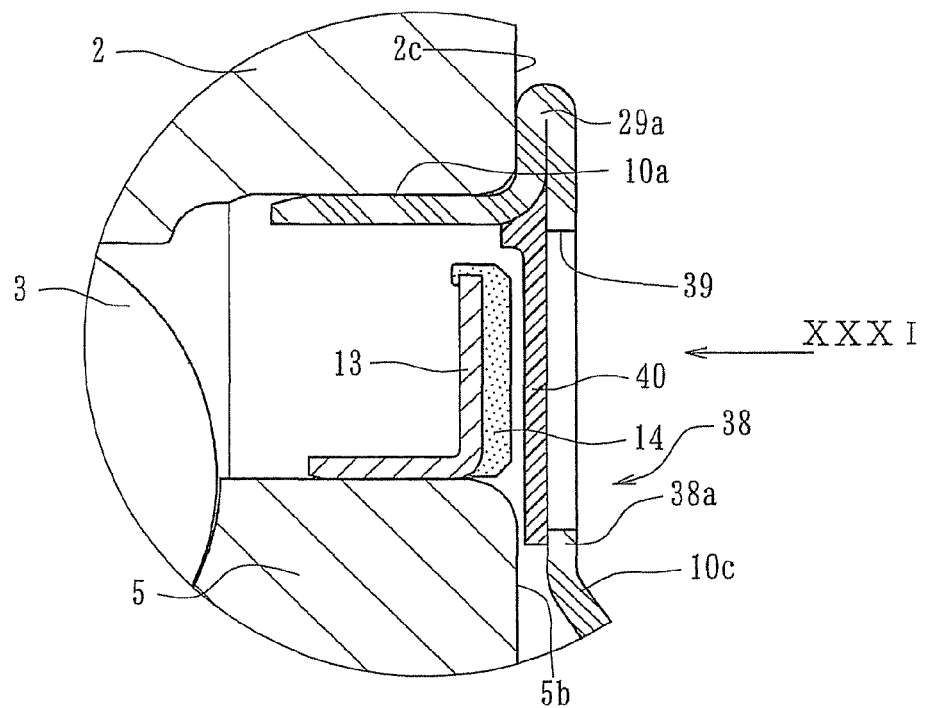
FIG. 30 is an enlarged partial view of a detecting portion of FIG. 29.
Figure 31:
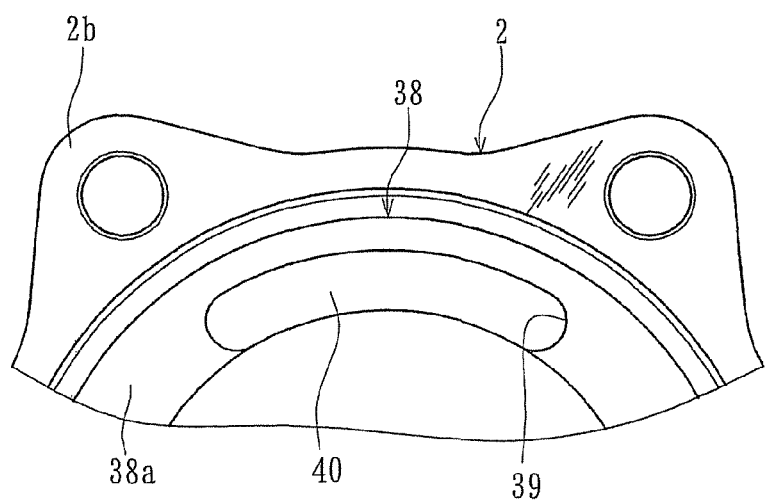
FIG. 31 is a partial front elevation view along an arrow XXXI in FIG. 30.
Figure 32:
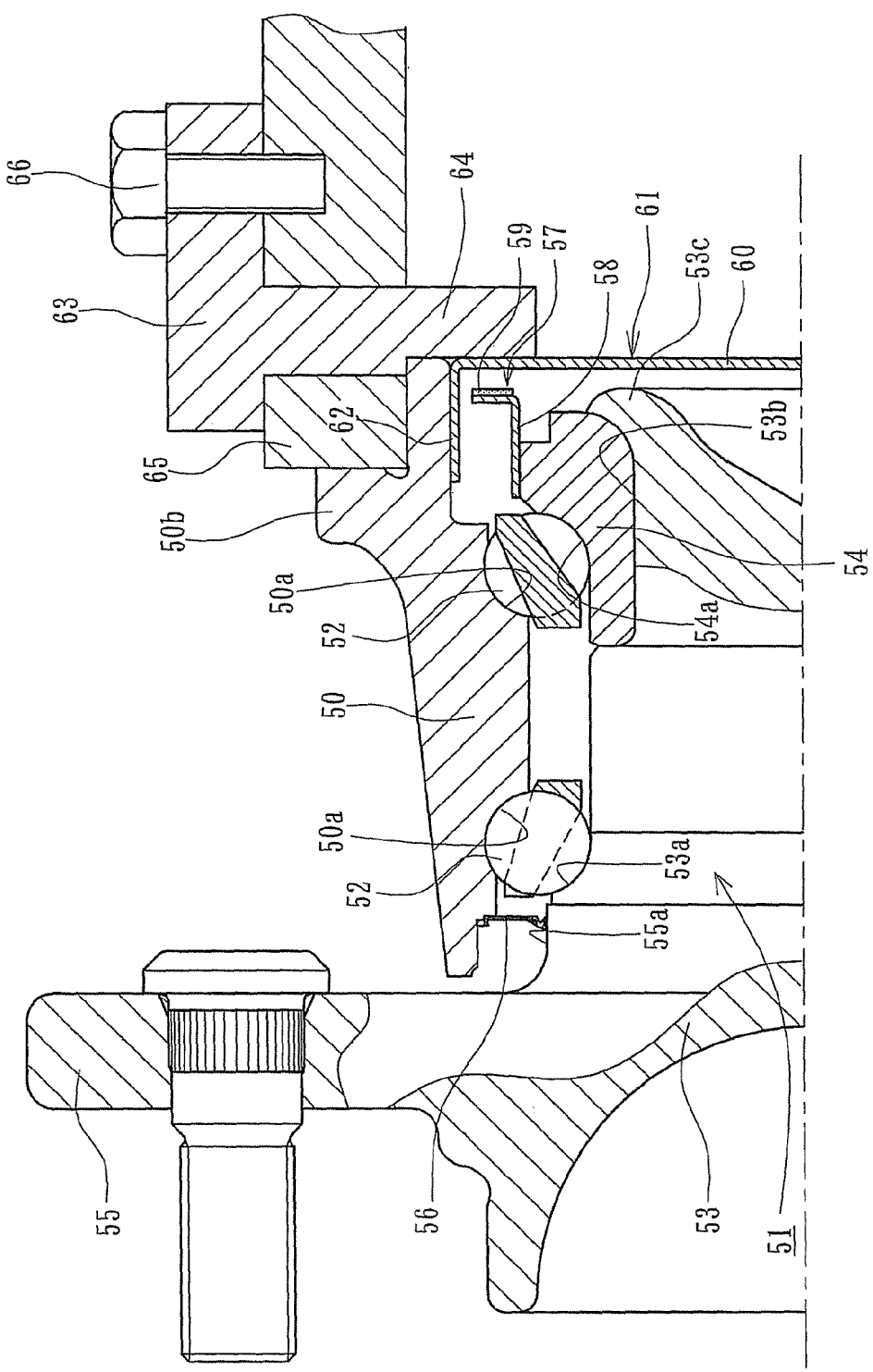
FIG. 32 is a longitudinal-section view of a prior art wheel bearing apparatus incorporating a wheel speed detecting apparatus.

FIG. 29 is a longitudinal-section view of a twelfth embodiment of a wheel bearing apparatus incorporating a wheel speed detecting apparatus. FIG. 30 is an enlarged partial view of a detecting portion of FIG. 29. FIG. 31 is a partial front elevation view along an arrow XXXI in FIG. 30. This embodiment is basically different from the seventh embodiment (FIG. 17) only in a structure of the shielding portion of the protecting cover. Accordingly, the same reference numerals are used to identify parts or portions of this embodiment that have the same functions as those of the seventh embodiment.

A protecting cover 38 is mounted on the inner side end of the outer member 2. The protecting cover 38 is press-formed of SPCC, SPCD or SPCE of cold rolled steel sheet (JIS G 3141). The cover 38 has a substantially dish-shaped configuration. In particular, SPCD and SPCE are preferable in view of improved drawability. The protecting cover 38 includes a cylindrical fitting portion 10a adapted to be press-fit into the inner circumference of the outer member 2. A flange portion 29a is adapted to be in close contact with the inner side end face 2c of the outer member 2. A shielding portion 38a extends radially inward from the flange portion 29a. A bottom portion 10d extends from the shielding portion 38a, via an inclined portion 10c, to close the inner side end of the inner member 1.

In this embodiment an arcuate through aperture 39 is formed in the shielding portion 38a of the protecting cover 38. An elastic member 40, of synthetic rubber such as nitrile rubber to close the through aperture 39, is integrally adhered to the protecting cover 38 by vulcanizing adhesion as shown in FIG. 30. That is, the magnetic encoder 14 and a sensor (not shown) can be arranged opposite to each other via the elastic member 40. This enables some error in accuracy for both circumferential and axial positioning of the protecting cover 38 relative to the sensor. Thus, this insures desirable detecting accuracy. In addition this enables use of cold rolled steel sheet, which is superior in deep drawability without the use of expensive stainless steel. Thus, this enables a reduction in the manufacturing cost.

The wheel bearing apparatus incorporating a wheel speed detecting apparatus of the present disclosure can be applied to wheel bearing apparatus of the first through third generation type of inner ring rotation structures.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus incorporating a wheel speed detecting apparatus comprising:
    an outer member integrally formed with double row outer raceway surfaces on its inner circumference;
    an inner member including a wheel hub and at least one inner ring, the wheel hub being integrally formed with a wheel mounting flange on its one end, a cylindrical portion axially extending from the wheel mounting flange, the inner ring being press fit onto the cylindrical portion of the wheel hub, the wheel hub and the inner ring being formed on their outer circumferences with double row inner raceway surfaces opposing the double row outer raceway surfaces, the inner ring is axially secured on the wheel hub under a predetermined bearing pre-pressure by a caulked portion, the caulked portion is formed by plastically deforming the end of the cylindrical portion of the wheel hub;
    double row rolling elements are contained between the inner and outer raceway surfaces of the inner and outer members;
    a magnetic encoder is mounted on the inner ring;
    annular openings are formed by the inner and outer members, the annular openings are sealed by a seal mounted on an outer side end of the outer member and by a protecting cover;
    the protecting cover has a substantially dish-shaped configuration, the protecting cover is press-formed from a non-magnetic austenitic stainless steel sheet; and
    the protecting cover further comprising a cylindrical fitting portion adapted to be fit onto the outer member, a disc-shaped shielding portion extending radially inward from the fitting portion, a recess formed in the disc-shaped shielding portion for containing a sensor therein so that the sensor is accessible to the magnetic encoder, and a bottom portion extending from the shielding portion via an inclined portion close to an inner side end of the inner member, and the protecting cover is positioned to abut against a stepped portion formed on the end face or the inner circumference of the outer member.

2. The wheel bearing apparatus incorporating the wheel speed detecting apparatus of claim 1, wherein the protecting cover further comprises a flange portion formed as a folded and stacked portion extending radially outward from the fitting portion and the flange portion is adapted to be in close contact with an inner side end face of the outer member.

3. The wheel bearing apparatus incorporating the wheel speed detecting apparatus of claim 2, wherein a detecting surface of the magnetic encoder is arranged to project from the inner side end face of the outer member by a length "a" and the projected length "a" is set smaller than a thickness "t" of the protecting cover a<t.

4. The wheel bearing apparatus incorporating the wheel speed detecting apparatus of claim 1, wherein the protecting cover further comprises a central recess formed at the center of the bottom portion of the protecting cover so that it extends into a recess encircled by the caulked portion.

5. The wheel bearing apparatus incorporating the wheel speed detecting apparatus of claim 4, wherein the central recess is formed with a substantially rectangular cross-section along the configuration of the recess encircled by the caulked portion.

6. The wheel bearing apparatus incorporating the wheel speed detecting apparatus of claim 1, wherein an access enabling amount "c", enabling the sensor to be positioned adjacent to the magnetic encoder, is set smaller than the thickness "b" of the flange portion of the protecting cover c<b.

7. The wheel bearing apparatus incorporating the wheel speed detecting apparatus of claim 6 wherein the recess is formed with an arcuate configuration.

8. The wheel bearing apparatus incorporating the wheel speed detecting apparatus of claim 1, wherein the recess is formed with an arcuate configuration.

9. The wheel bearing apparatus incorporating the wheel speed detecting apparatus of claim 1 wherein the protecting cover further comprises a through aperture formed in its shielding portion where an elastic member, close to the through aperture, is integrally adhered by vulcanizing adhesion, and the magnetic encoder and the sensor are arranged opposite to each other via the elastic member.

10. The wheel bearing apparatus incorporating the wheel speed detecting apparatus of claim 9 wherein the through aperture is formed with an arcuate configuration.

11. The wheel bearing apparatus incorporating the wheel speed detecting apparatus of claim 1 wherein an elastic member is integrally adhered to the protecting cover by vulcanizing adhesion, the elastic member is adapted to contact with the inner side end face of the outer member.

12. The wheel bearing apparatus incorporating the wheel speed detecting apparatus of claim 11 wherein an adhesive agent used for the vulcanized adhesion of the elastic members is applied to the whole surface or the surface to be fit onto the outer member of the protecting cover.

13. The wheel bearing apparatus incorporating the wheel speed detecting apparatus of claim 1 wherein an elastic member is integrally adhered to a free end of the fitting portion of the protecting cover by vulcanizing adhesion, the elastic member is adapted to be press-fit into or contact with the inner side end portion of the outer member.

14. The wheel bearing apparatus incorporating the wheel speed detecting apparatus of claim 13 wherein an adhesive agent used for the vulcanized adhesion of the elastic members is applied to the whole surface or the surface to be fit onto the outer member of the protecting cover.

15. A wheel bearing apparatus incorporating with a wheel speed detecting apparatus comprising:
    an outer member integrally formed with double row outer raceway surfaces on its inner circumference;
    an inner member including a wheel hub and at least one inner ring, the wheel hub being integrally formed with a wheel mounting flange on its one end, a cylindrical portion axially extending from the wheel mounting flange, the inner ring being press fit onto the cylindrical portion of the wheel hub, the wheel hub and the inner ring being formed on their outer circumferences with double row inner raceway surfaces opposing the double row outer raceway surfaces, the inner ring is axially secured on the wheel hub under a predetermined bearing pre-pressure by a caulked portion, the caulked portion is formed by plastically deforming the end of the cylindrical portion of the wheel hub;

double row rolling elements are contained between the inner and outer raceway surfaces of the inner and outer members;

a magnetic encoder is mounted on the inner ring;

annular openings are formed between the inner and outer members, the annular openings are sealed by a seal mounted on an outer side end of the outer member and by a protecting cover;

the protecting cover has a substantially dish-shaped configuration, the protecting cover is press-formed from a non-magnetic austenitic stainless steel sheet; and the protecting cover further comprising a cylindrical fitting portion adapted to be fit onto the outer member, a disc-shaped shielding portion extending radially inward from the fitting portion, a recess formed in the disc-shaped shielding portion for containing a sensor therein so that the sensor is accessible to the magnetic encoder, and a bottom portion extending from the shielding portion via an inclined portion close to the inner side end of the inner member, and the protecting cover is positioned to abut against a stepped portion formed on an end face or the inner circumference of an outer member or against a portion of the outer circumferential surface of the outer member.

16. A wheel bearing apparatus incorporating a wheel speed detecting apparatus comprising:

an outer member integrally formed with double row outer raceway surfaces on its inner circumference;

an inner member including a wheel hub and at least one inner ring, the wheel hub being integrally formed with a wheel mounting flange on its one end, a cylindrical portion axially extending from the wheel mounting flange, the inner ring being press fit onto the cylindrical portion of the wheel hub, the wheel hub and the inner ring being formed on their outer circumferences with double row inner raceway surfaces opposing the double row outer raceway surfaces, the inner ring is axially secured on the wheel hub under a predetermined bearing pre-pressure by a caulked portion, the caulked portion is formed by plastically deforming the end of the cylindrical portion of the wheel hub;

double row rolling elements are contained between the inner and outer raceway surfaces of the inner and outer members;

a magnetic encoder is mounted on the inner ring;

annular openings are formed by the inner and outer members, the annular openings are sealed by a seal mounted on an outer side end of the outer member and by a protecting cover;

the protecting cover has a substantially dish-shaped configuration, the protecting cover is press-formed from a non-magnetic austenitic stainless steel sheet; and the protecting cover further comprising a cylindrical fitting portion adapted to be fit onto the outer member, a disc-shaped shielding portion extending radially inward from the fitting portion, a through aperture formed in the disc-shaped shielding portion where an elastic member, close to the through aperture, is integrally adhered by vulcanizing adhesion, and the magnetic encoder and the sensor are arranged opposite to each other via the elastic member, and a bottom portion extending from the shielding portion via an inclined portion close to an inner side end of the inner member, and the protecting cover is positioned to abut against a stepped portion formed on the end face or the inner circumference of the outer member.

17. The wheel bearing apparatus incorporating the wheel speed detecting apparatus of claim 16 wherein the through aperture is formed with an arcuate configuration.

* * * * *